US012592888B2

(12) United States Patent
Xu et al.

(10) Patent No.: US 12,592,888 B2
(45) Date of Patent: Mar. 31, 2026

(54) HIGH-ACCESS-RATE DATA OBJECT TRANSFER

(71) Applicant: Lemon Inc., Grand Cayman (KY)

(72) Inventors: Peng Xu, Los Angeles, CA (US); Yan Sun, Los Angeles, CA (US); Fei Liu, Los Angeles, CA (US); Kyoungryun Bae, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 133 days.

(21) Appl. No.: 18/518,361

(22) Filed: Nov. 22, 2023

(65) Prior Publication Data

US 2024/0137318 A1      Apr. 25, 2024

(51) Int. Cl.
*H04L 47/12* (2022.01)
*G06N 20/00* (2019.01)
*H04L 67/1097* (2022.01)

(52) U.S. Cl.
CPC ............. *H04L 47/12* (2013.01); *G06N 20/00* (2019.01); *H04L 67/1097* (2013.01)

(58) Field of Classification Search
None
See application file for complete search history.

(56) References Cited

U.S. PATENT DOCUMENTS

| | | | |
|---|---|---|---|
| 2019/0163795 A1* | 5/2019 | Lai | ......................... G06F 16/221 |
| 2019/0354290 A1 | 11/2019 | Ben Dayan et al. | |
| 2022/0004330 A1* | 1/2022 | Guim Bernat | ........ G06F 3/0631 |
| 2024/0028209 A1* | 1/2024 | Berke | ..................... G06F 13/28 |

OTHER PUBLICATIONS

Wischik, D. et al., "Design, implementation and evaluation of congestion control for multipath TCP," Proceedings of USENIX conference on Networked systems design and implementation, Mar. 30, 2011, Boston, MA, 14 pages.
Khalili, R. et al., "MPTCP is not Pareto-Optimal: Performance Issues and a Possible Solution," IEEE/ACM Transactions on Networking, vol. 21, No. 5, Aug. 21, 2013, 15 pages.
Han, H. et al., "Overlay TCP for Multi-Path Routing and Congestion Control," Proceedings of IMA Workshop on Measurements and Modeling of the Internet, Jan. 2004, 24 pages.
Raiciu, C. et al., "Coupled Congestion Control for Multipath Transport Protocols," Internet Engineering Task Force, RFC 6356, Oct. 2011, 12 pages.
European Patent Office, Extended European Search Report Issued in Application No. 24209175.9, May 9, 2025, Germany, 12 pages.

* cited by examiner

*Primary Examiner* — Natisha D Cox
(74) *Attorney, Agent, or Firm* — Alleman Hall LLP

(57) ABSTRACT

A computing system including one or more processing devices configured to detect a congestion condition occurring at a first storage node located in a storage network of a distributed storage system. The one or more processing devices are further configured to obtain respective first access rate data for a first plurality of data objects stored at the first storage node. Based at least in part on the first access rate data, the one or more processing devices are further configured to flag a first data object as a high-access-rate data object. The one or more processing devices are further configured to compute a transfer path between the first storage node and a second storage node in the storage network. The one or more processing devices are further configured to transfer the high-access-rate data object from the first storage node to the second storage node along the transfer path.

18 Claims, 15 Drawing Sheets

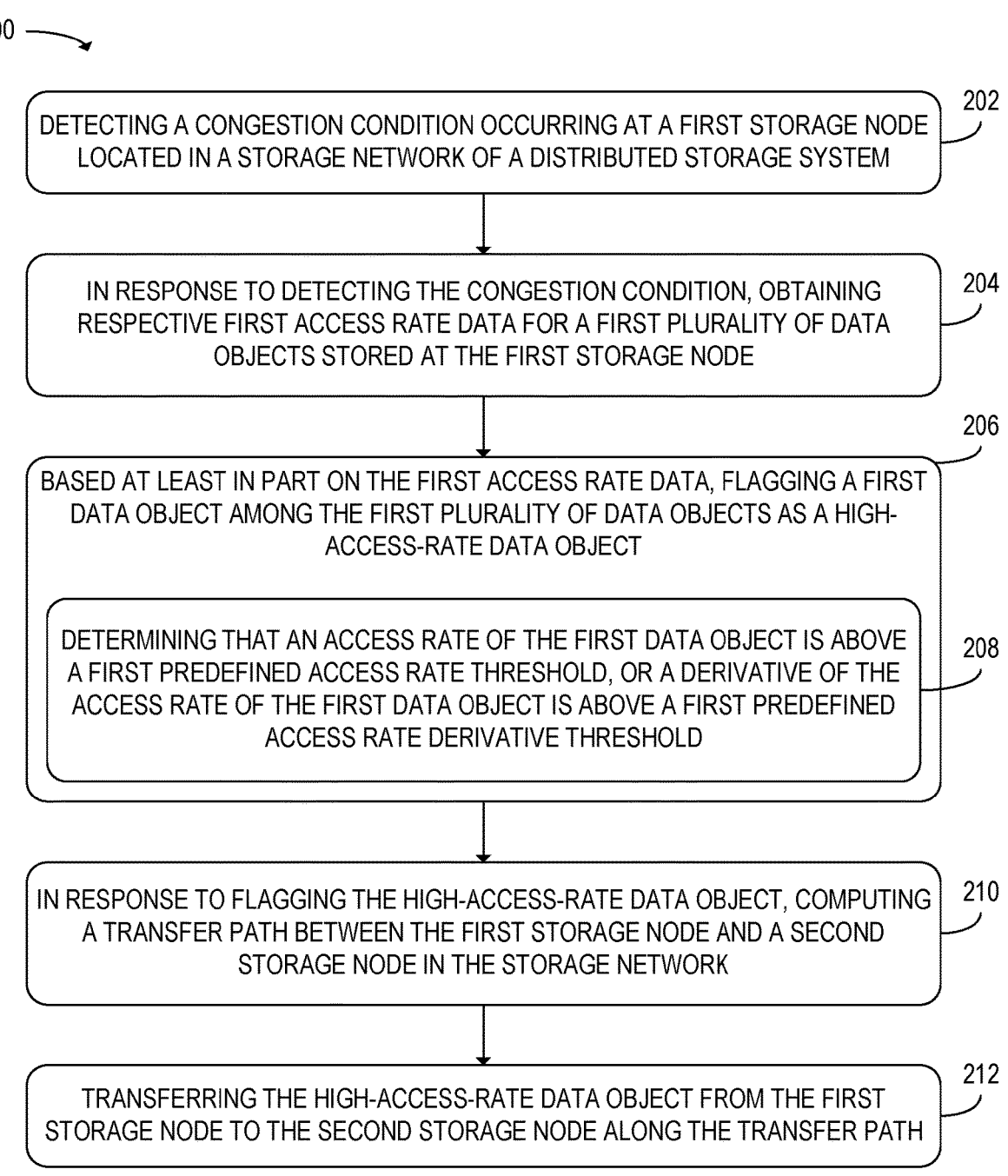

200

202

DETECTING A CONGESTION CONDITION OCCURRING AT A FIRST STORAGE NODE LOCATED IN A STORAGE NETWORK OF A DISTRIBUTED STORAGE SYSTEM

204

IN RESPONSE TO DETECTING THE CONGESTION CONDITION, OBTAINING RESPECTIVE FIRST ACCESS RATE DATA FOR A FIRST PLURALITY OF DATA OBJECTS STORED AT THE FIRST STORAGE NODE

206

BASED AT LEAST IN PART ON THE FIRST ACCESS RATE DATA, FLAGGING A FIRST DATA OBJECT AMONG THE FIRST PLURALITY OF DATA OBJECTS AS A HIGH-ACCESS-RATE DATA OBJECT

208

DETERMINING THAT AN ACCESS RATE OF THE FIRST DATA OBJECT IS ABOVE A FIRST PREDEFINED ACCESS RATE THRESHOLD, OR A DERIVATIVE OF THE ACCESS RATE OF THE FIRST DATA OBJECT IS ABOVE A FIRST PREDEFINED ACCESS RATE DERIVATIVE THRESHOLD

210

IN RESPONSE TO FLAGGING THE HIGH-ACCESS-RATE DATA OBJECT, COMPUTING A TRANSFER PATH BETWEEN THE FIRST STORAGE NODE AND A SECOND STORAGE NODE IN THE STORAGE NETWORK

212

TRANSFERRING THE HIGH-ACCESS-RATE DATA OBJECT FROM THE FIRST STORAGE NODE TO THE SECOND STORAGE NODE ALONG THE TRANSFER PATH

FIG. 8A

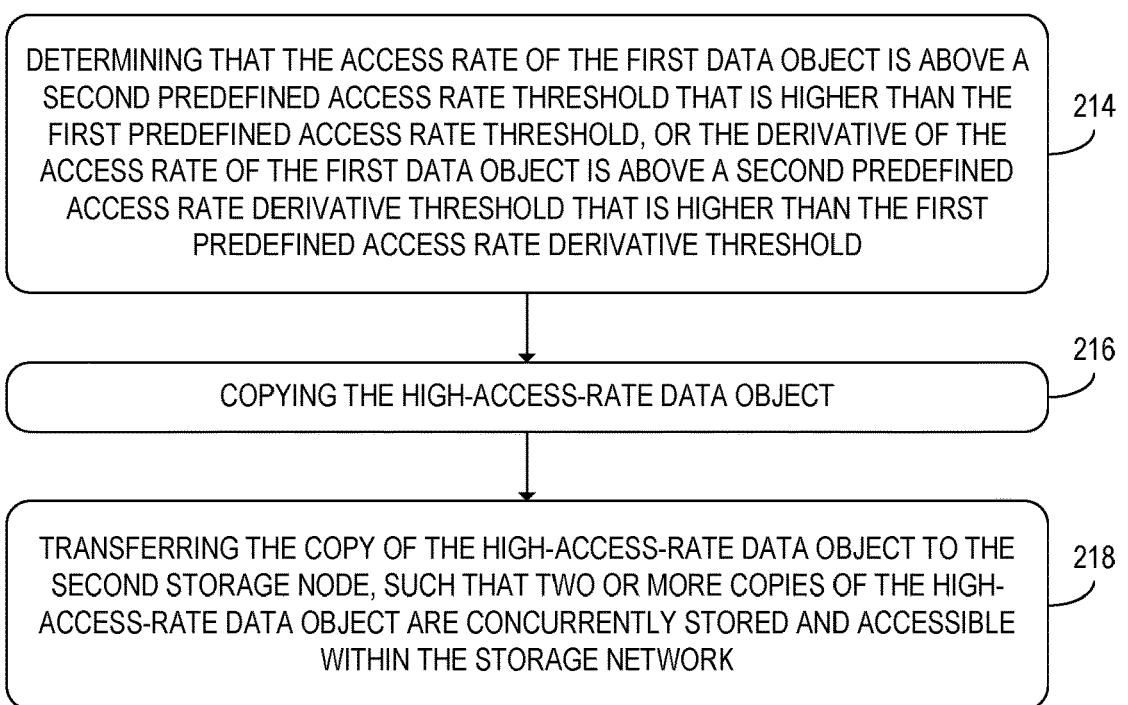

DETERMINING THAT THE ACCESS RATE OF THE FIRST DATA OBJECT IS ABOVE A SECOND PREDEFINED ACCESS RATE THRESHOLD THAT IS HIGHER THAN THE FIRST PREDEFINED ACCESS RATE THRESHOLD, OR THE DERIVATIVE OF THE ACCESS RATE OF THE FIRST DATA OBJECT IS ABOVE A SECOND PREDEFINED ACCESS RATE DERIVATIVE THRESHOLD THAT IS HIGHER THAN THE FIRST PREDEFINED ACCESS RATE DERIVATIVE THRESHOLD　　214

COPYING THE HIGH-ACCESS-RATE DATA OBJECT　　216

TRANSFERRING THE COPY OF THE HIGH-ACCESS-RATE DATA OBJECT TO THE SECOND STORAGE NODE, SUCH THAT TWO OR MORE COPIES OF THE HIGH-ACCESS-RATE DATA OBJECT ARE CONCURRENTLY STORED AND ACCESSIBLE WITHIN THE STORAGE NETWORK　　218

FIG. 8B

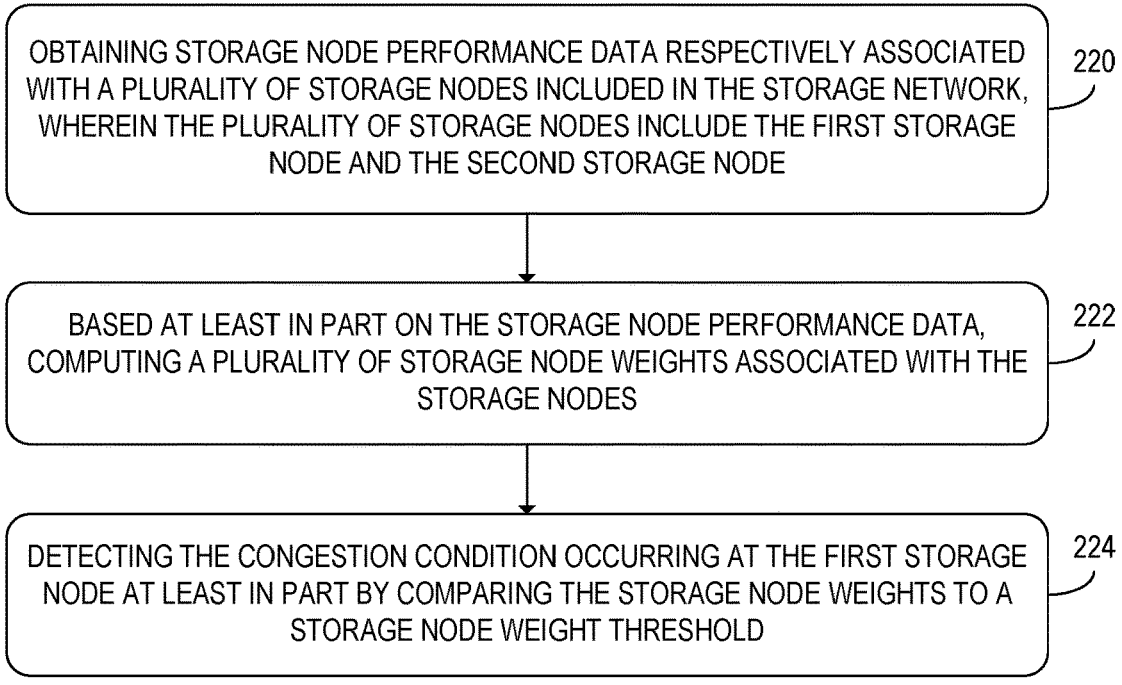

OBTAINING STORAGE NODE PERFORMANCE DATA RESPECTIVELY ASSOCIATED WITH A PLURALITY OF STORAGE NODES INCLUDED IN THE STORAGE NETWORK, WHEREIN THE PLURALITY OF STORAGE NODES INCLUDE THE FIRST STORAGE NODE AND THE SECOND STORAGE NODE　　220

BASED AT LEAST IN PART ON THE STORAGE NODE PERFORMANCE DATA, COMPUTING A PLURALITY OF STORAGE NODE WEIGHTS ASSOCIATED WITH THE STORAGE NODES　　222

DETECTING THE CONGESTION CONDITION OCCURRING AT THE FIRST STORAGE NODE AT LEAST IN PART BY COMPARING THE STORAGE NODE WEIGHTS TO A STORAGE NODE WEIGHT THRESHOLD　　224

FIG. 8C

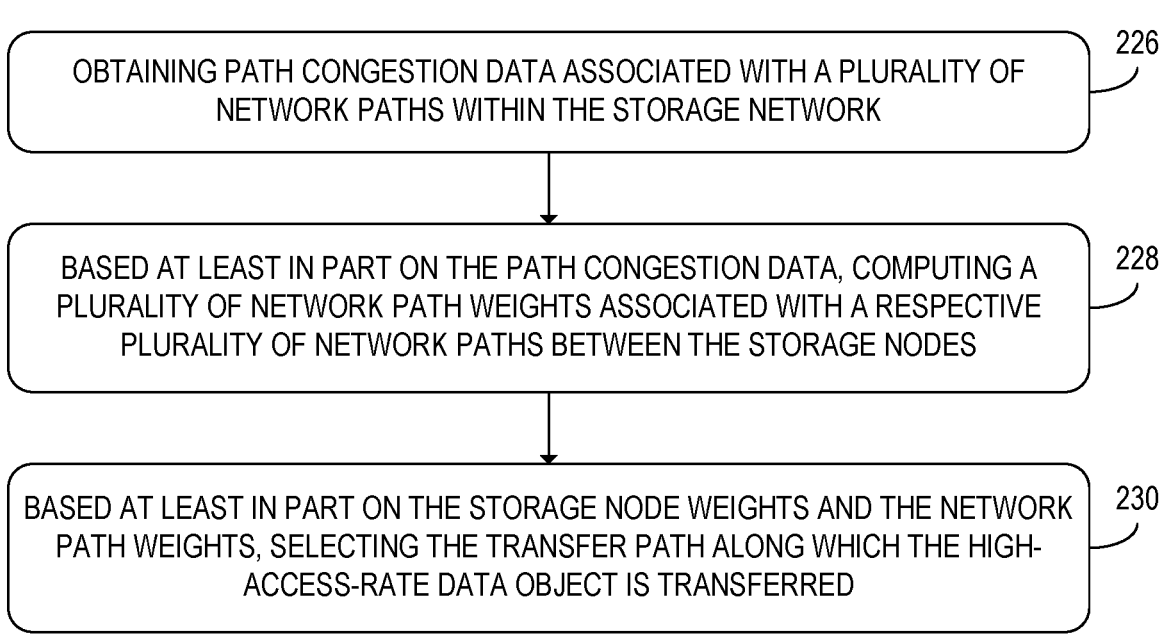

226 — OBTAINING PATH CONGESTION DATA ASSOCIATED WITH A PLURALITY OF NETWORK PATHS WITHIN THE STORAGE NETWORK

228 — BASED AT LEAST IN PART ON THE PATH CONGESTION DATA, COMPUTING A PLURALITY OF NETWORK PATH WEIGHTS ASSOCIATED WITH A RESPECTIVE PLURALITY OF NETWORK PATHS BETWEEN THE STORAGE NODES

230 — BASED AT LEAST IN PART ON THE STORAGE NODE WEIGHTS AND THE NETWORK PATH WEIGHTS, SELECTING THE TRANSFER PATH ALONG WHICH THE HIGH-ACCESS-RATE DATA OBJECT IS TRANSFERRED

FIG. 8D

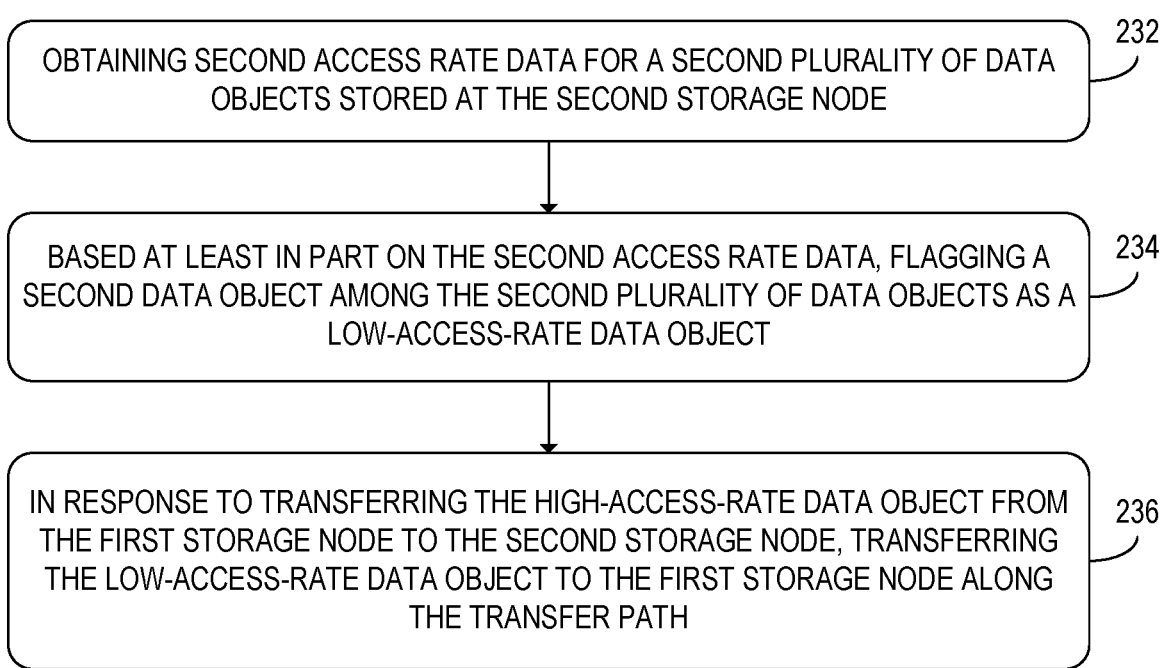

232 — OBTAINING SECOND ACCESS RATE DATA FOR A SECOND PLURALITY OF DATA OBJECTS STORED AT THE SECOND STORAGE NODE

234 — BASED AT LEAST IN PART ON THE SECOND ACCESS RATE DATA, FLAGGING A SECOND DATA OBJECT AMONG THE SECOND PLURALITY OF DATA OBJECTS AS A LOW-ACCESS-RATE DATA OBJECT

236 — IN RESPONSE TO TRANSFERRING THE HIGH-ACCESS-RATE DATA OBJECT FROM THE FIRST STORAGE NODE TO THE SECOND STORAGE NODE, TRANSFERRING THE LOW-ACCESS-RATE DATA OBJECT TO THE FIRST STORAGE NODE ALONG THE TRANSFER PATH

FIG. 8E

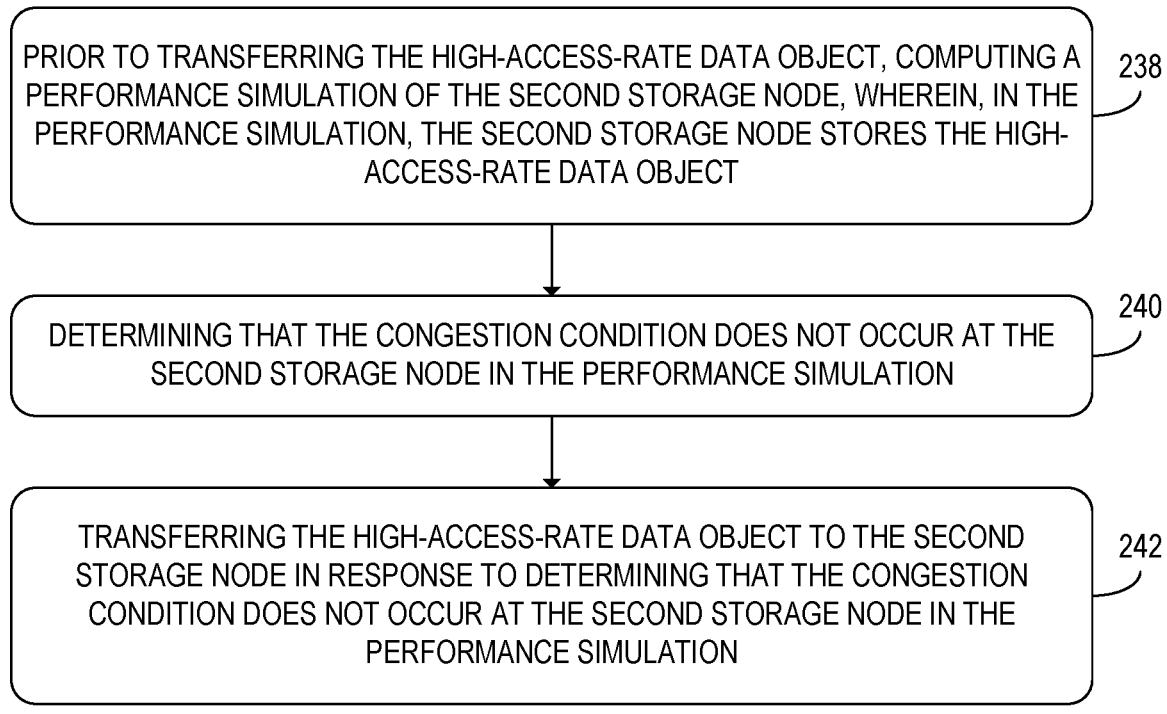

PRIOR TO TRANSFERRING THE HIGH-ACCESS-RATE DATA OBJECT, COMPUTING A PERFORMANCE SIMULATION OF THE SECOND STORAGE NODE, WHEREIN, IN THE PERFORMANCE SIMULATION, THE SECOND STORAGE NODE STORES THE HIGH-ACCESS-RATE DATA OBJECT — 238

DETERMINING THAT THE CONGESTION CONDITION DOES NOT OCCUR AT THE SECOND STORAGE NODE IN THE PERFORMANCE SIMULATION — 240

TRANSFERRING THE HIGH-ACCESS-RATE DATA OBJECT TO THE SECOND STORAGE NODE IN RESPONSE TO DETERMINING THAT THE CONGESTION CONDITION DOES NOT OCCUR AT THE SECOND STORAGE NODE IN THE PERFORMANCE SIMULATION — 242

FIG. 8F

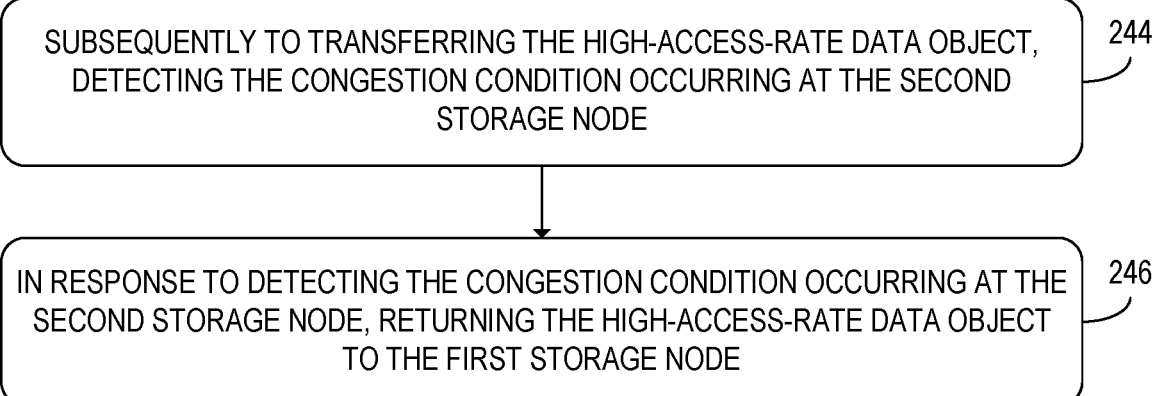

SUBSEQUENTLY TO TRANSFERRING THE HIGH-ACCESS-RATE DATA OBJECT, DETECTING THE CONGESTION CONDITION OCCURRING AT THE SECOND STORAGE NODE — 244

IN RESPONSE TO DETECTING THE CONGESTION CONDITION OCCURRING AT THE SECOND STORAGE NODE, RETURNING THE HIGH-ACCESS-RATE DATA OBJECT TO THE FIRST STORAGE NODE — 246

FIG. 8G

HIGH-ACCESS-RATE DATA OBJECT TRANSFER

BACKGROUND

Computing devices referred to as storage nodes are used for cloud storage of data. These storage nodes are included in distributed storage systems in which multiple storage nodes are networked together. For example, the storage nodes may be located in a data center. To upload and download data stored at the distributed storage system, client devices communicate with the storage nodes through the storage network that connects the storage nodes.

When client devices access data stored in a distributed storage system, the distributed storage system sometimes experiences congestion. Congestion occurs when large numbers of requests are received at a specific component of the distributed storage system, thereby resulting in processing delays. This congestion may occur during network transport or at a storage node endpoint.

SUMMARY

To address these issues, according to one aspect of the present disclosure, a computing system is provided. The computing system includes one or more processing devices configured to detect a congestion condition occurring at a first storage node located in a storage network of a distributed storage system. In response to detecting the congestion condition, the one or more processing devices are further configured to obtain respective first access rate data for a first plurality of data objects stored at the first storage node. Based at least in part on the first access rate data, the one or more processing devices are further configured to flag a first data object among the first plurality of data objects as a high-access-rate data object. In response to flagging the high-access-rate data object, the one or more processing devices are further configured to compute a transfer path between the first storage node and a second storage node in the storage network. The one or more processing devices are further configured to transfer the high-access-rate data object from the first storage node to the second storage node along the transfer path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A shows a flowchart of a method for use with a computing system to execute a scheduler and a controller for a storage network of a distributed storage system, according to the example of FIG. 1A.

FIGS. 8B-8G show additional steps of the method of FIG. 8A that may be performed in some examples.

DETAILED DESCRIPTION

Various techniques have previously been developed to alleviate congestion that occurs at the network level. Routing algorithms have been used to direct network traffic along different paths through the network in order to prevent or mitigate network congestion. For example, multipath transfer may be used to decrease the variance in amounts of network traffic through different paths.

Separately from these approaches to decreasing network-level congestion, techniques for increasing the efficiency of storage nodes have also been developed. For example, key-value engines of distributed storage systems have been developed in a manner aimed at increasing the efficiency of specific database operations. At the hardware level, different types of memory devices (e.g. solid state drives (SSDs), hard disk drives (HDDs), and magnetic memory) are used to store data depending on the expected access rate of the data.

According to previous approaches to reducing congestion, techniques based on rerouting traffic at the network level do not address congestion that occurs at the storage node level, and storage-node-level techniques do not address congestion that occurs at the network level. In existing storage networks, storage and networking each have their own control plane and data plane that provide programmability for developers to define and implement their policies for resource management and scheduling. Using these control planes and data planes, storage and networking are managed separately in existing data centers. This separate management sometimes decreases the end-to-end performance due to lack of coordination between storage and networking.

In some applications, such as video streaming, the rate at which a data object is accessed by client devices may vary widely over time. For example, an infrequently accessed video may "go viral" and have a sudden increase in its access rate. Accordingly, the storage node that stores the video may experience congestion. These rapid changes in access rate may occur unpredictably and may therefore be difficult to account for using existing storage node efficiency techniques.

In order to address the above challenges, approaches to reducing storage-node-level congestion are provided below. Using the following techniques, data objects with high access rates are relocated to different storage nodes. This relocation allows the storage network to achieve a more even distribution of traffic at the storage nodes, thereby decreasing congestion.

Figure 1A:
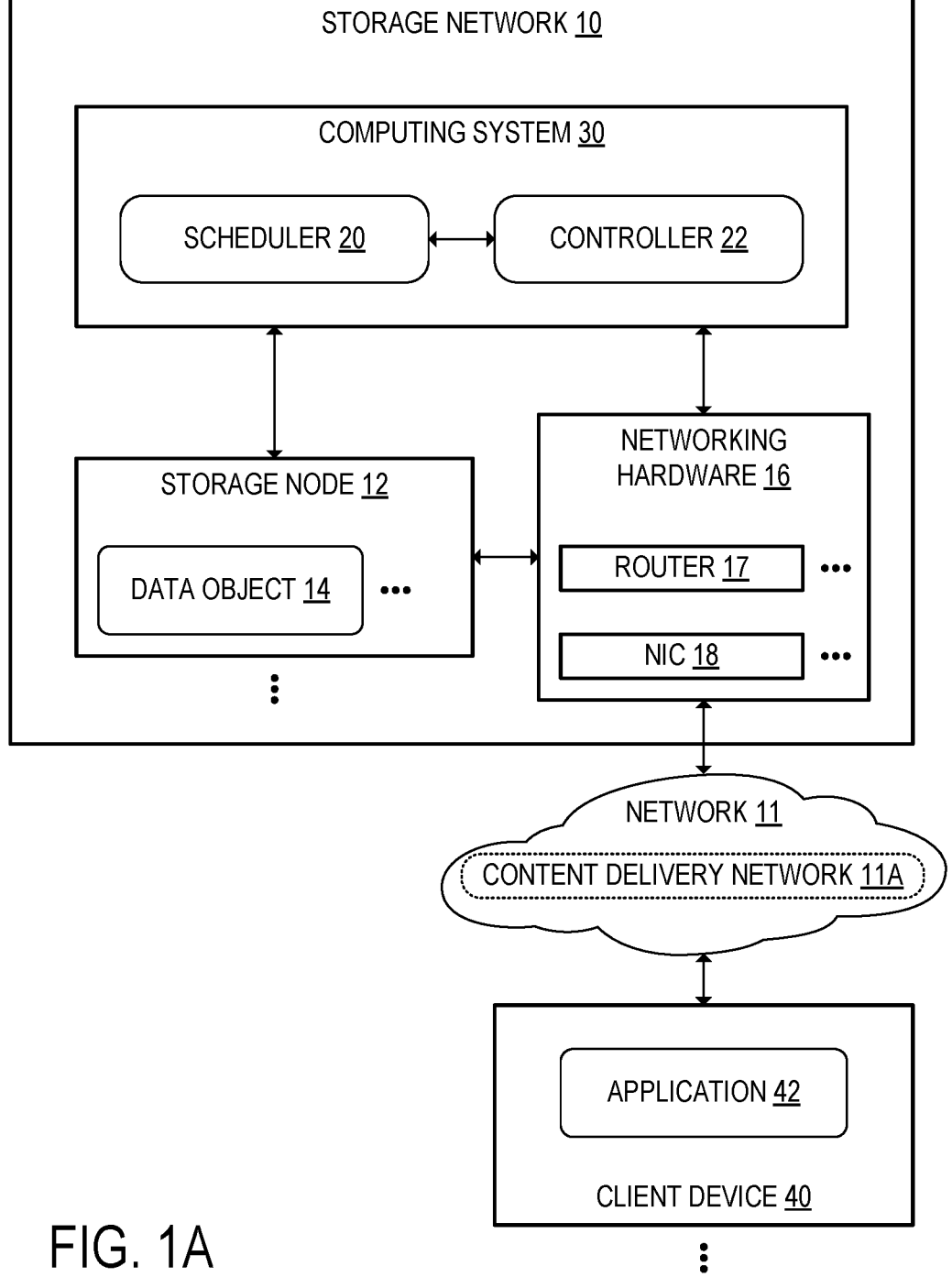
FIG. 1A schematically shows a storage network within which one or more data objects may be relocated, according to one example embodiment.

FIG. 1A schematically shows an example storage network 10 at which the data object relocation approach may be used. The storage network 10 includes a plurality of storage nodes 12 that each store a plurality of data objects 14. The storage nodes 12 are physical server computing devices at which the data objects 14 are stored in memory devices. The storage network 10 further includes networking hardware 16, which includes a plurality of routers 17 and network interface controllers (NICs) 18. Via the networking hardware 16, the one or more storage nodes 12 are configured to communicate with a plurality of client devices 40 over a computer network 11 such as the Internet. The client devices 40 execute respective applications 42 that communicate with the storage nodes 12 to upload and/or download data objects 14. It will be appreciated that a content delivery network 11A, separate from the storage network 10, may be utilized to cache copies of data objects 14 on servers within the content delivery network 11A that are closer to the client devices 40 on the network 11, to thereby speed delivery of the data objects 14 to the client devices 40 and decrease network congestion. Although multiple copies of a data object 14 may be cached within the content delivery network 11A, typically only one copy of the data object 14 is stored within the storage network 10 to conserve storage space, although in some cases two copies of the data object may be stored in the storage network, for example during migration of the data object from one location to another. Archival copies of the data object 14 also may be stored in archival locations accessible to the storage network. In other examples, multiple copies of the data object 14 may be stored in the storage network 10.

The storage network 10 further includes a computing system 30 at which a scheduler 20 and a controller 22 are configured to be executed. The scheduler 20, as discussed in further detail below, is configured to monitor the performance of network paths and determine whether congestion occurs. In addition, the scheduler 20 is configured to compute predictions of future network performance. The controller 22 is configured to perform the relocation of data objects 14 between storage nodes 12 as discussed below.

Figure 1B:
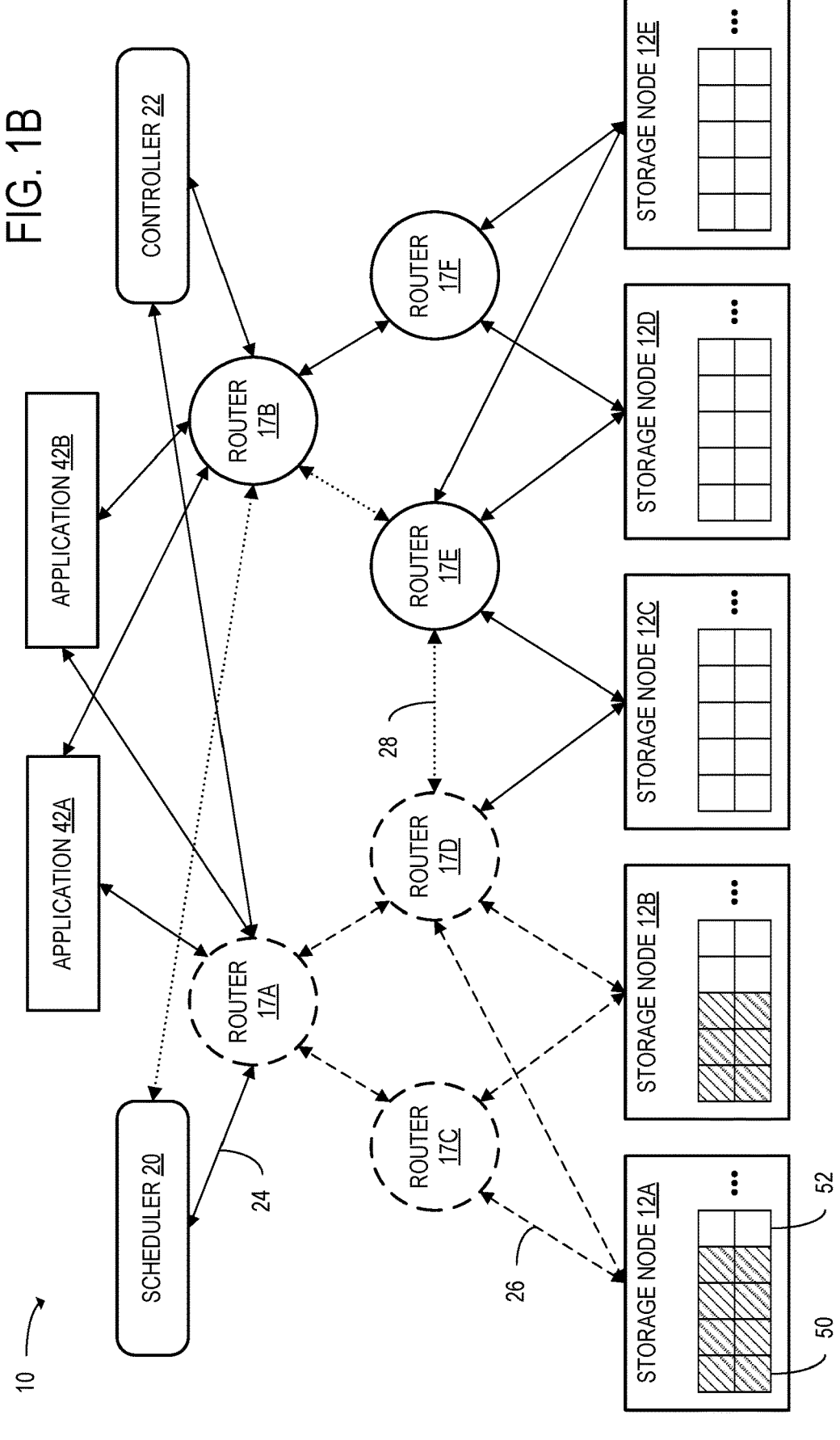
FIG. 1B schematically shows an example storage network when congestion occurs at storage nodes, according to the example of FIG. 1A.

FIG. 1B schematically shows an example storage network 10 when congestion occurs at storage nodes. The example storage network 10 of FIG. 1B includes storage nodes 12A, 12B, 12C, 12D, and 12E. The example storage network 10 further includes routers 17A, 17B, 17C, 17D, 17E, and 17F that connect the storage nodes to applications 42A and 42B executed at respective client devices 40. The routers 17 are arranged in an upper layer that includes routers 17A and 17B, as well as a lower layer that includes routers 17C, 17D, 17E, and 17F. The scheduler 20 and controller 22 are configured to interface with the routers 17A and 17B of the upper layer, which connect the routers of the lower layer to the applications 42A and 42B. Connections 24 between the components included in the storage network 10 are also shown in FIG. 1B.

In the example storage network 10 of FIG. 1B, the storage nodes 12A and 12B both store a plurality of high-access-rate data objects 50, while the storage nodes 12C, 12D, and 12E only store low-access-rate data objects 52. The high-access-rate data objects 50 are therefore unevenly distributed between the storage nodes 12. This uneven distribution leads to overloading of the routers 17A, 17C, and 17D, as well as overloading of the connections that are connected to those routers. Overloaded connections 26 are indicated with dashed lines in the example of FIG. 1B. FIG. 1B accordingly shows that congestion at storage nodes 12 can lead to congestion in larger portions of the storage network 10.

In order to mitigate the congestion at the routers 17A, 17C, and 17D, as well as at the overloaded connections 26 associated with those routers, the controller 22 may be configured to establish alternative connections 28 using conventional network routing techniques. These alternative connections 28 redirect portions of network traffic from router 17A to router 17B and from router 17D to router 17E. However, since access to the high-access-rate data objects 50 is bottlenecked at the storage nodes 12A and 12B instead of at any of the routers 17, the connections 26 to and from the storage nodes 12A and 12B are still overloaded.

Figure 2:
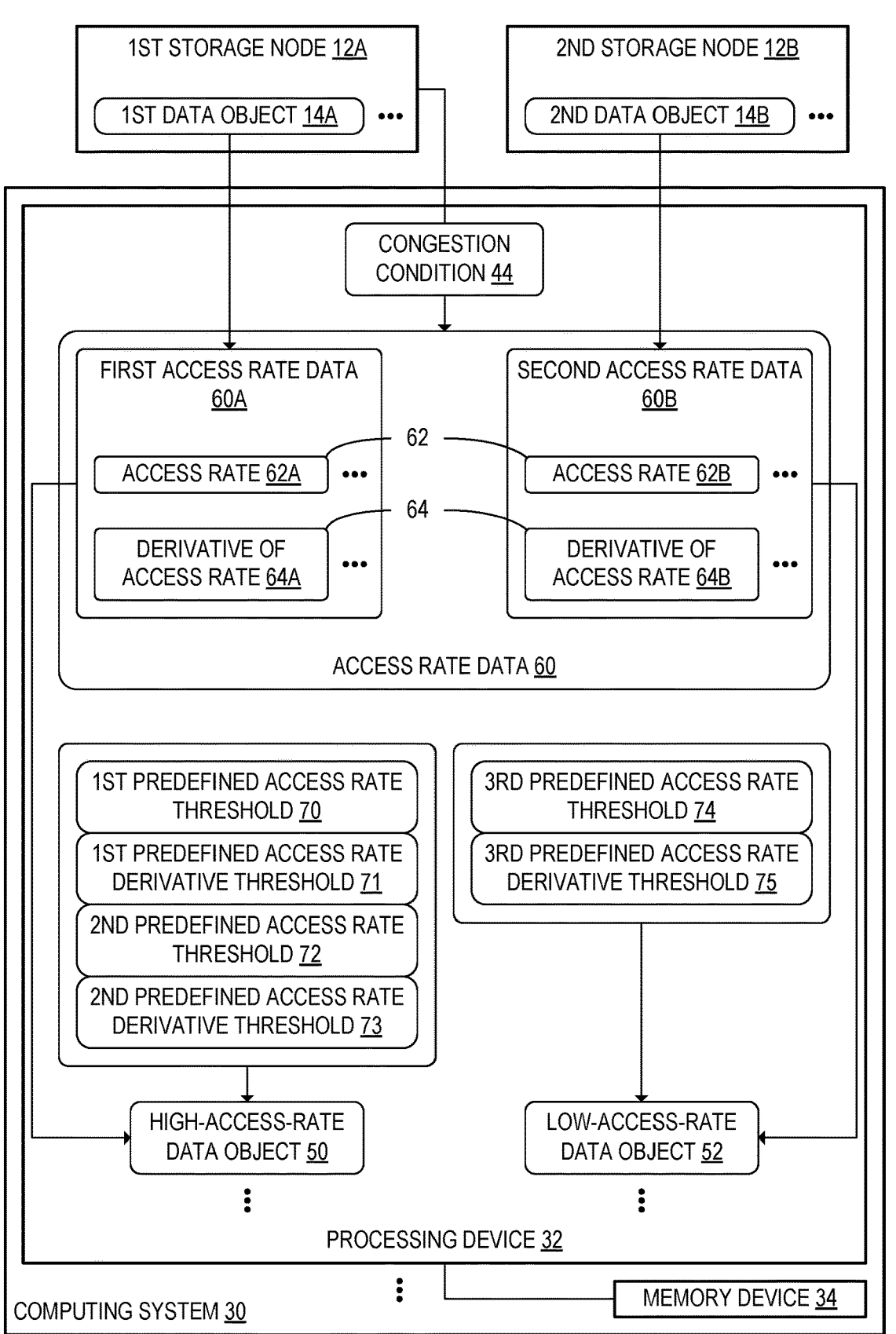
FIG. 2 schematically shows a computing system configured to detect a congestion condition and identify a high-access-rate data object, according to the example of FIG. 1A.

FIG. 2 schematically shows the computing system 30 of FIG. 1A in additional detail, according to one example. The computing system 30 includes one or more processing devices 32 and one or more memory devices 34. The computing system 30 may be implemented at a single physical computing device or across multiple networked computing devices.

To address the congestion issues described above, the one or more processing devices 32 are configured to detect a congestion condition 44 occurring at a first storage node 12A located in the storage network 10. For example, the congestion condition 44 may be detected based on latency data associated with the first storage node 12A, as discussed in further detail below. Thus, the one or more processing devices 32 are configured to determine that congestion has occurred at the first storage node 12A.

FIG. 2 shows the computing system 30 when the one or more processing devices 32 are configured to identify high-access-rate data objects 50 and low-access-rate data objects 52. This identification may be performed at the scheduler 20 in response to detecting the congestion condition 44. At the scheduler 20, the one or more processing devices 32 are configured to obtain access rate data 60. This access rate data 60 includes a plurality of access rates 62 and a plurality of derivates of access rates 64. The access rate data 60 includes respective first access rate data 60A for a first plurality of data objects 14 stored at the first storage node 12A. The first access rate data 60A, as shown in the example of FIG. 2, includes a plurality of access rates 62A of those data objects 14, as well as derivatives of the access rates 64A.

Based at least in part on the first access rate data 60A, the one or more processing devices 32 are further configured to flag a first data object 14A among the first plurality of data objects 14 as a high-access-rate data object 50. In some examples, the one or more processing devices 32 are configured to flag the first data object 14A as the high-access-rate data object 50 in response to determining that the access rate 62A of the first data object 14A is above a first predefined access rate threshold 70. The detection and flagging may occur in a storage network control plane. The flag on the first data object 14A could be metadata stored in a table accessible to the storage network control plane, or as metadata in the data object itself, as some examples. Additionally or alternatively, the one or more processing devices 32 may be configured to flag the first data object 14A as the high-access-rate data object 50 in response to determining that the derivative of the access rate 64A of the first data object 14A is above a first predefined access rate derivative threshold 71. Accordingly, the first data object 14A is identified as having a high access rate 62A or a rapidly increasing access rate 62A, compared to respective baseline values of the access rate 62A and the derivative of the access rate 64A.

In some examples, the one or more processing devices 32 may be further configured to determine that the access rate 62A of the first data object 14A is above a second predefined access rate threshold 72 that is higher than the first predefined access rate threshold 70. Additionally or alternatively, the one or more processing devices 32 may determine that the derivative of the access rate 64A of the first data object 14A is above a second predefined access rate derivative threshold 73 that is higher than the first predefined access rate derivative threshold 71. The one or more processing devices 32 are accordingly configured to categorize the first data object 14A into a higher access rate level than that which is defined by the first thresholds.

Figure 3A:
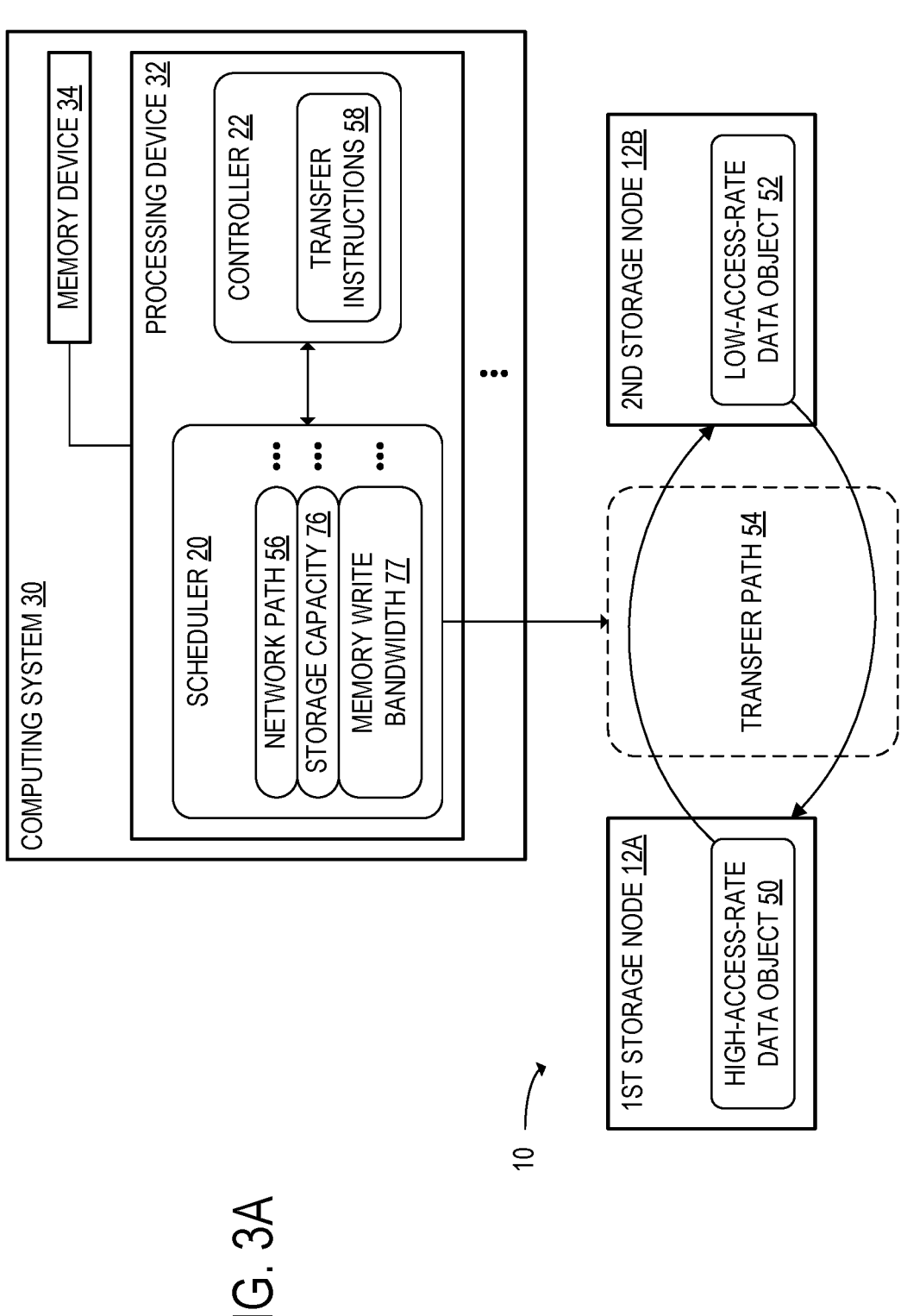
FIG. 3A schematically shows the computing system, a first storage node, and a second storage node when data objects are transferred between the storage nodes, according to the example of FIG. 2.

Turning now to FIG. 3A, the one or more processing devices 32 are further configured to compute a transfer path 54 between the first storage node 12A and a second storage node 12B in the storage network 10. The first storage node 12A and the second storage node 12B may be located in the same data center. The one or more processing devices 32 may be configured to compute the transfer path 54 at the scheduler 20. The transfer path 54 is selected from among a plurality of possible network paths 56 that connect the first storage node 12A to the second storage node 12B. Each of the network paths 56 includes a plurality of the connections 24 between components of the storage network 10.

Subsequently to computing the transfer path 54, the one or more processing devices 32 are further configured to transfer the high-access-rate data object 50 from the first storage node 12A to the second storage node 12B along the transfer path 54. In the example of FIG. 3A, the controller 22 is configured to generate transfer instructions 58 for the first storage node 12A to transfer the high-access-rate data object 50 to the second storage node 12B, and the computing system 30 is configured to transmit the transfer instructions 58 to the first storage node 12A. The high-access-rate data object 50 is therefore offloaded from the first storage node 12A, which may decrease the latency of communication with the first storage node 12A. In some examples, the controller 22 is configured to perform multi-path transfer by transferring portions of the high-access-rate data object 50 along different respective transfer paths 54, thereby avoiding transfer path congestion when a large data object is transferred.

Returning to the example of FIG. 2A, the one or more processing devices 32 may be further configured to obtain second access rate data 60B for a second plurality of data objects 14 stored at a second storage node 12B. The second access rate data 60B includes respective access rates 62B and derivatives of the access rates 64B for the second plurality of data objects 14. Based at least in part on the second access rate data 60B, the one or more processing devices 32 may be further configured to flag a second data object 14B among the second plurality of data objects 14 as a low-access-rate data object 52. The second data object 14B may be flagged as a low-access-rate data object 52 in response to determining that the access rate 62B of the second data object 14B is below a third predefined access rate threshold 74 or that the derivative of the access rate 64B is below a third predefined access rate derivative threshold 75.

As shown in FIG. 3A, in response to transferring the high-access-rate data object 50 from the first storage node 12A to the second storage node 12B, and to flagging the second data object 14B as the low-access-rate data object 52, the one or more processing devices 32 are, in some examples, further configured to transfer the low-access-rate data object 52 to the first storage node 12A along the transfer path 54. The one or more processing devices 32 are thereby configured to redistribute data objects 14 between the first storage node 12A and the second storage node 12B. Similarly to the high-access-rate data object 50, the low-access-rate data object 52 may also be transferred via multi-path transfer in some examples.

In some examples, data related to storage and memory usage at the first storage node 12A may be used at the scheduler 20 when determining whether to transfer the second data object 14B to the first storage node 12A. As additional criteria for transferring the second data object 14B to the first storage node 12A, the one or more processing devices 32 may be further configured to determine that the first storage node 12A has sufficient storage capacity 76 to store the second data object 14B, and/or that the first storage node 12A also has sufficient memory write bandwidth 77 to write the second data object 14B to the first storage node 12A.

Figure 3B:
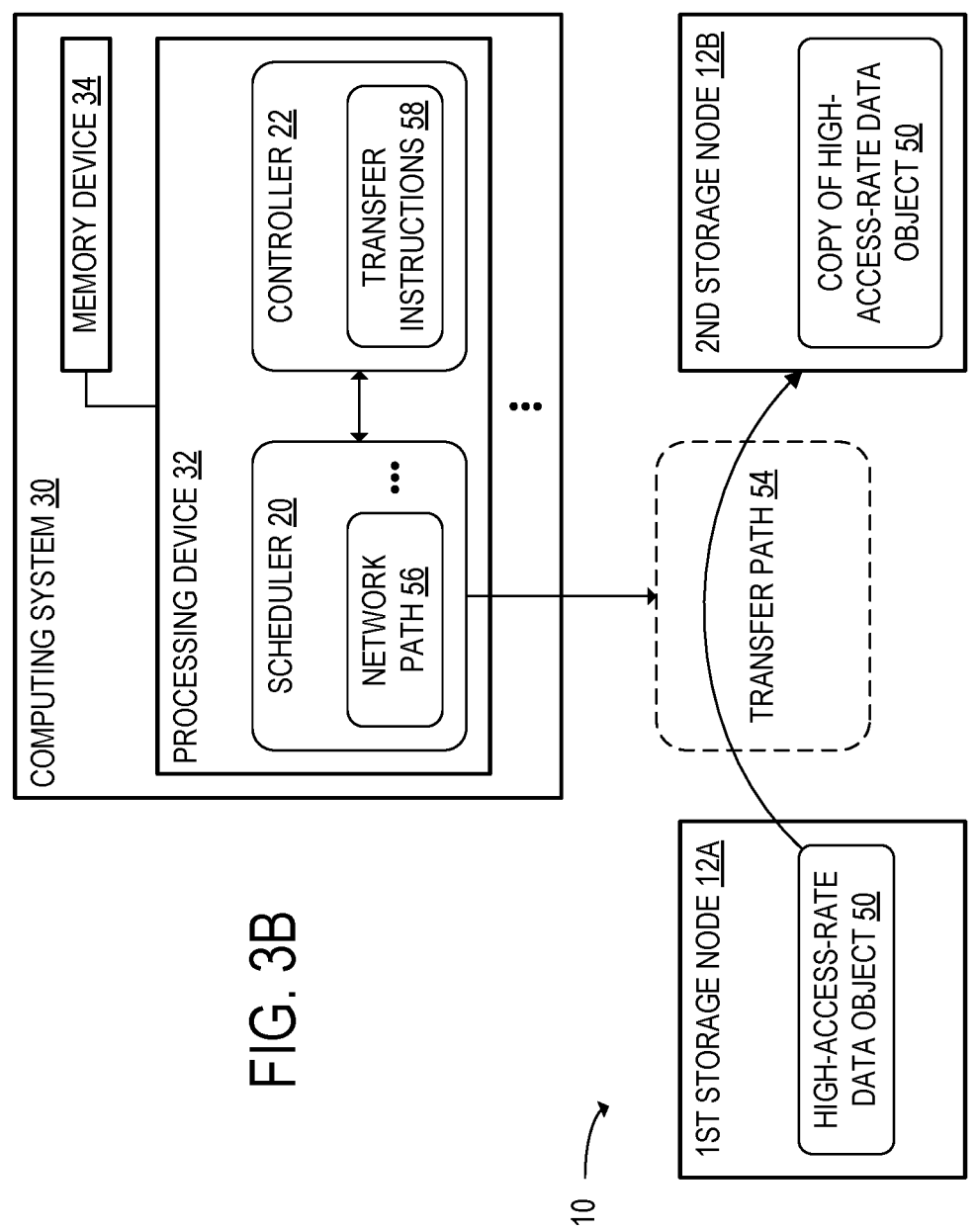
FIG. 3B schematically shows the computing system, the first storage node, and the second storage node when the first storage node and the second storage node store copies of a high-access-rate data object, according to the example of FIG. 2.

FIG. 3B schematically shows another example in which the high-access-rate data object 50 is transferred from the first storage node 12A to the second storage node 12B. In the example of FIG. 3B, the one or more processing devices 32 are further configured to copy the high-access-rate data object 50. The one or more processing devices 32 are further configured to transfer the copy of the high-access-rate data object 50 to the second storage node 12B, such that two or more copies of the high-access-rate data object 50 are concurrently stored and accessible within the storage network 10. Accordingly, in the example of FIG. 3B, congestion at the first storage node 12A is reduced by making the high-access-rate data object 50 accessible from two different storage nodes 12.

In some examples, the one or more processing devices 32 may be configured to copy the high-access-rate data object 50 and transfer the copy in response to determining that the access rate 62A of the first data object 14A is above a second predefined access rate threshold 72, where the second predefined access rate threshold 72 is higher than the first predefined access rate threshold 70. Additionally or alternatively, the one or more processing devices 32 may be configured to copy the high-access-rate data object 50 and transfer the copy in response to determining that the derivative of the access rate 64A of the first data object 14A is above a second predefined access rate derivative threshold 73, where the second predefined access rate derivative threshold 73 is higher than the first predefined access rate derivative threshold 71. The one or more processing devices 32 may accordingly copy the high-access-rate data object 50 under conditions in which the access rate 62A or the derivative of the access rate 64A is sufficiently high that it surpasses a second threshold as well as a first threshold.

Figure 3C:
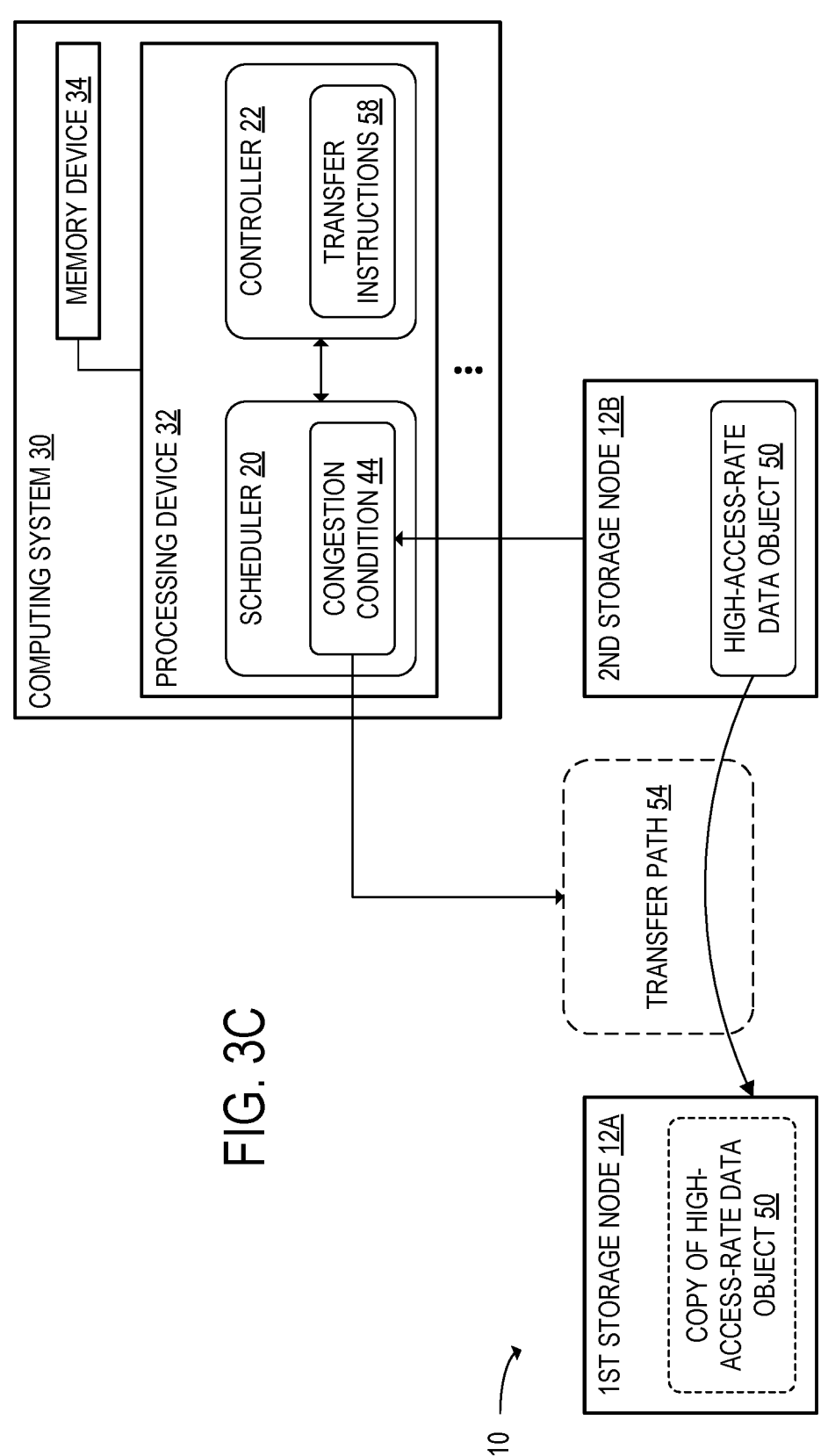
FIG. 3C schematically shows the computing system, the first storage node, and the second storage node when the high-access-rate data object is returned from the second storage node to the first storage node, according to the example of FIG. 2.

In some examples, as shown in FIG. 3C, the one or more processing devices 32 are further configured to detect the congestion condition 44 occurring at the second storage node 12B subsequently to transferring the high-access-rate data object 50 from the first storage node 12A to the second storage node 12B. In response to detecting the congestion condition occurring at the second storage node, the one or more processing devices 32 may be further configured to return the high-access-rate data object 50 to the first storage node 12A. Accordingly, the one or more processing devices 32 may be configured to roll back the transfer of the high-access-rate data object 50 to the second storage node 12B in examples in which this transfer does not alleviate the congestion condition 44. In some such examples, a copy of the high-access-rate data object 50 is transferred to the first storage node 12A, such that the first storage node 12A and the second storage node 12B concurrently store copies of the high-access-rate data object 50 as shown in FIG. 3B.

Figure 4:
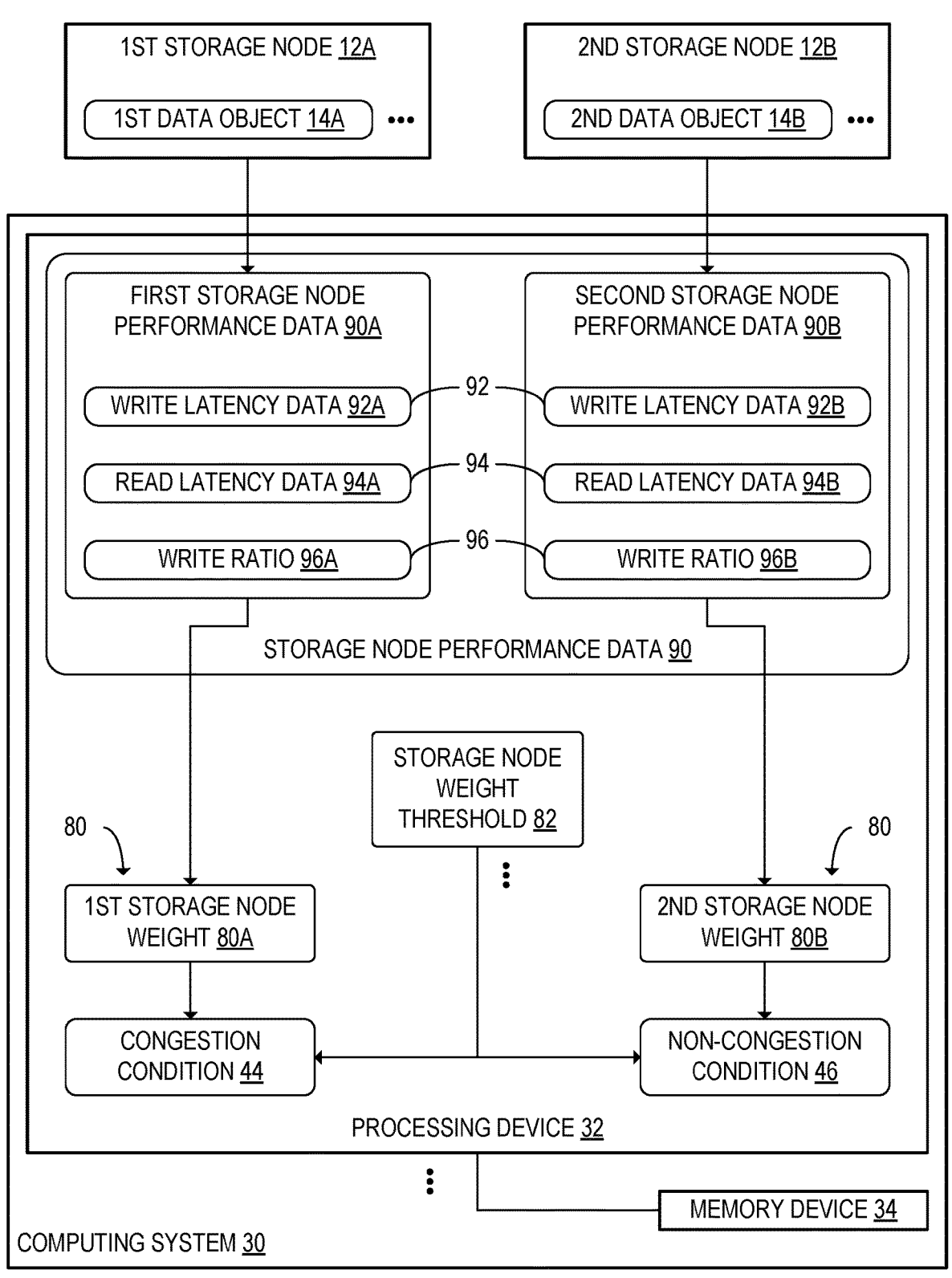
FIG. 4 schematically shows the computing system when the congestion condition is detected using storage node performance data, according to the example of FIG. 2.

FIG. 4 schematically shows the computing system 30 when the congestion condition 44 is detected, as discussed above. As shown in the example of FIG. 4, the identification of the congestion condition 44 may be based at least in part on one or more respective storage node weights 80 computed for the storage nodes 12 at the scheduler 20. In the example of FIG. 4, the one or more processing devices 32 are configured to compute storage node weights 80 including a first storage node weight 80A of the first storage node 12A and a second storage node weight 80B of the second storage node 12B. In addition to detecting the congestion condition 44 in the example of FIG. 4, the one or more processing devices 32 are also configured to identify a non-congestion condition 46 at the second storage node 12B. The non-congestion condition 46 may indicate the second storage node 12B as an eligible recipient of the high-access-rate data object 50.

In the example of FIG. 4, the one or more processing devices 32 are further configured to compute the storage node weights 80 using storage node performance data 90 associated with the plurality of storage nodes 12. The example storage node performance data 90 includes respective write latency data 92, read latency data 94, and write ratios 96 for the storage nodes. The write latency data 92 indicates the latencies of write operations at the storage nodes 12 and the read latency data 94 indicates the latencies of read operations at the storage nodes 12. The write ratio 96 indicated a ratio of write operations to read operations, which varies depending on the workloads of the storage nodes 12. The example of FIG. 4 shows first storage node performance data 90A that is associated with the first storage node 12A and includes write latency data 92A, read latency data 94A, and a write ratio 96A. The example of FIG. 4 further shows second storage node performance data 90B that is associated with the second storage node 12B and includes write latency data 92B, read latency data 94B, and a write ratio 96B.

In one example of the computation of the storage node weights 80, the one or more processing devices 32 are configured to compute each of the storage node weights 80 as follows:

$$\text{weight} = \text{write\_latency\_weight} * \text{write\_ratio} +$$
$$\text{read\_latency\_weight} * (1 - \text{write\_ratio})$$

Accordingly, the storage node weights 80 are average latencies in the above example. In the above equation, write_latency_weight and read_latency_weight may be selected from a set of write latency bins and a set of read latency bins, respectively, that correspond to different write latency and read latency levels (e.g., respective bins indicating low, medium, and high write latency and respective bins indicating low, medium, and high read latency). In some examples, the total storage node weight 80 across all the storage nodes 12 may be normalized to 1, such that the respective storage node weight 80 of each storage node 12 is expressed relative to the storage node weights 80 of the other storage nodes 12 in the storage network 10.

The one or more processing devices 32 may be further configured to compare the storage node weights 80 to a storage node weight threshold 82 to determine whether congestion has occurred at that storage node 12. In the example of FIG. 4, the one or more processing devices 32 determine that the first storage node weight 80A is below the storage node weight threshold 82 (with lower weights corresponding to more congestion in this example) and that the first storage node 12A therefore has the congestion condition 44. In contrast, the one or more processing devices 32 determine that the second storage node weight 80B is above the storage node weight threshold 82 and that the second storage node 12B therefore has the non-congestion condition 46.

Figure 5:
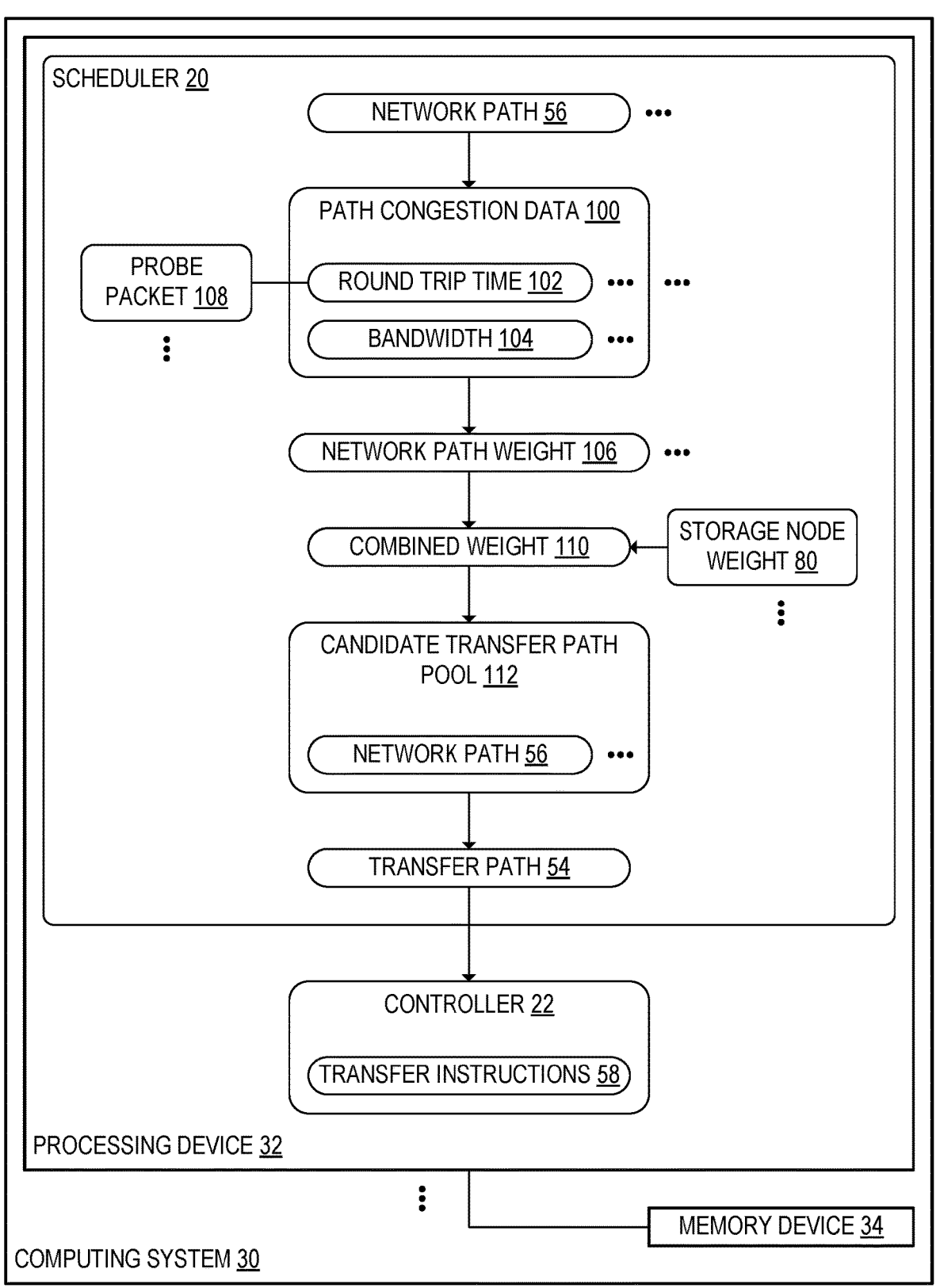
FIG. 5 schematically shows the computing system when a transfer path between the first storage node and the second storage node is computed, according to the example of FIG. 2.

FIG. 5 schematically shows the computing system 30 when a transfer path 54 is computed at the scheduler 20. In the example of FIG. 5, the one or more processing devices 32 are further configured to obtain path congestion data 100 associated with a plurality of the network paths 56 within the storage network 10. Each of these network paths 56 has a storage node 12 as an endpoint. The path congestion data 100 may, for example, include a plurality of round trip times (RTTs) 102 of respective probe packets 108 transmitted along the plurality of network paths 56. The path congestion data 100 may further include respective bandwidths 104 of the network paths 56.

Based at least in part on the path congestion data 100, The one or more processing devices 32 are further configured to compute a plurality of network path weights 106 associated with a respective plurality of the network paths 56 between the storage nodes 12. Similarly to the storage node weights 80, the network path weights 106 may each be selected from a set of predefined values associated with bins that correspond to amounts of latency (e.g., low, medium, and high RTTs 102).

The one or more processing devices 32 may be further configured to compute a plurality of combined weights 110 based at least in part on the network path weights 106 and the storage node weights 80 of the storage nodes 12 located at the respective endpoints of the network paths 56. In some examples, each of the combined weights 110 is a sum of the network path weight 106 of a network path 56 and the storage node weights 80 of both storage nodes 12 located at the endpoints of that network path 56. In other examples, the combined weights 110 may be computed as weighted sums of the network path weights 106 and the storage node weights 80.

The one or more processing devices 32 are further configured to select a candidate transfer path pool 112. The candidate transfer path pool 112 includes the top N highest-combined-weight network paths 56 among the plurality of network paths 56, where N is a predetermined pool size. In the example of FIG. 5, the one or more processing devices 32 are further configured to select the transfer path 54 at random from among the plurality of network paths 56 included in the candidate transfer path pool 112. The scheduler 20 is further configured to convey the selected transfer path 54 to the controller 22, at which the one or more processing devices 32 are further configured to generate transfer instructions 58 to transfer the high-access-rate data object 50 along the transfer path 54.

Figure 6:
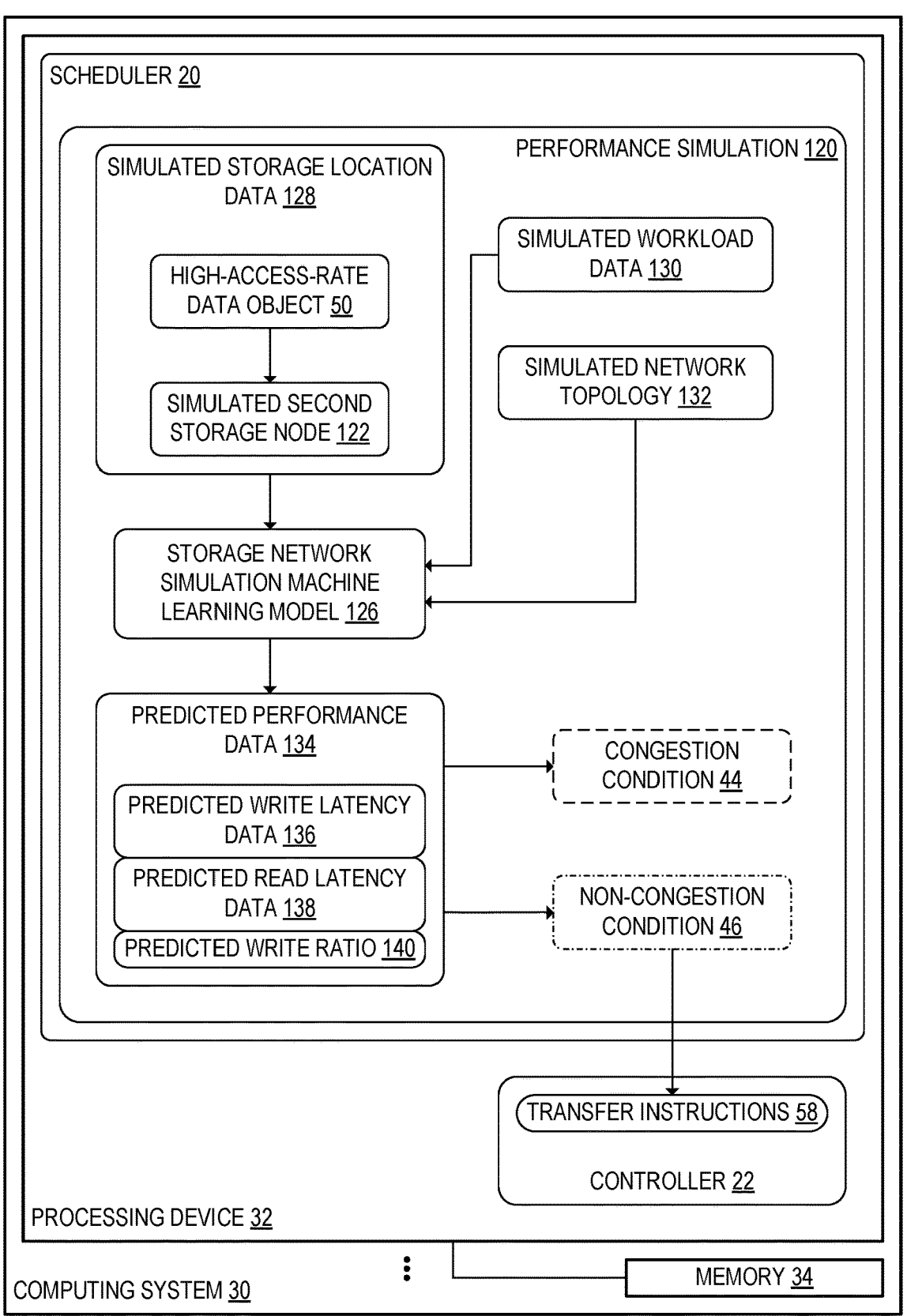
FIG. 6 schematically shows the computing system when a performance simulation of the second storage node is computed, according to the example of FIG. 2.

In some examples, prior to transferring the high-access-rate data object 50, the one or more processing devices 32 are further configured to compute a performance simulation 120 of the second storage node 12B, as shown in the example of FIG. 6. In the performance simulation 120, the scheduler 20 is configured to simulate the second storage node 12B when the second storage node 12B stores the high-access-rate data object 50. The one or more processing devices 32 are configured to compute a predicted access rate 124 of the high-access-rate data object 50 at a simulated second storage node 122.

The predicted access rate 124 may, for example, be computed at a storage network simulation machine learning model 126. In the example of FIG. 6, the inputs to the storage network simulation machine learning model 126 include simulated storage location data 128 that indicates the data objects 14 stored at respective storage nodes 12 in the performance simulation 120. The storage of the high-access-rate data object 50 at the simulated second storage node 122 is indicated in the simulated storage location data 128. The inputs to the storage network simulation machine learning model 126 may further include simulated workload data 130 that indicates simulated read and write operations performed at the storage nodes 12. In addition, the inputs to the storage network simulation machine learning model 126 may further include a simulated network topology 132 of the storage network 10.

At the storage network simulation machine learning model 126, the one or more processing devices 32 are configured to compute predicted performance data 134. The predicted performance data 134 may include predicted write latency data 136, predicted read latency data 138, and predicted write ratio data 140. This predicted performance data 134 is computed for the simulated second storage node 122 and may also be computed for one or more other simulated storage nodes in some examples.

The one or more processing devices 32 may be further configured to determine, based at least in part on the predicted performance data 134, that the congestion condition 44 does not occur at the simulated second storage node 122 in the performance simulation 120. Thus, the one or more processing devices 32 determine that the simulated second storage node 122 has the non-congestion condition 46. In response to determining that the congestion condition 44 does not occur at the simulated second storage node 122, the one or more processing devices 32 may be further configured to transfer the high-access-rate data object 50 to the second storage node 12B. The example of FIG. 6 shows the scheduler 20 outputting the transfer instructions 58 to the controller 22 in response to making this determination. Thus, prior to transferring the high-access-rate data object 50 to the second storage node 12B, the one or more processing devices 32 are configured to test whether congestion would still occur after the transfer.

Figure 7:
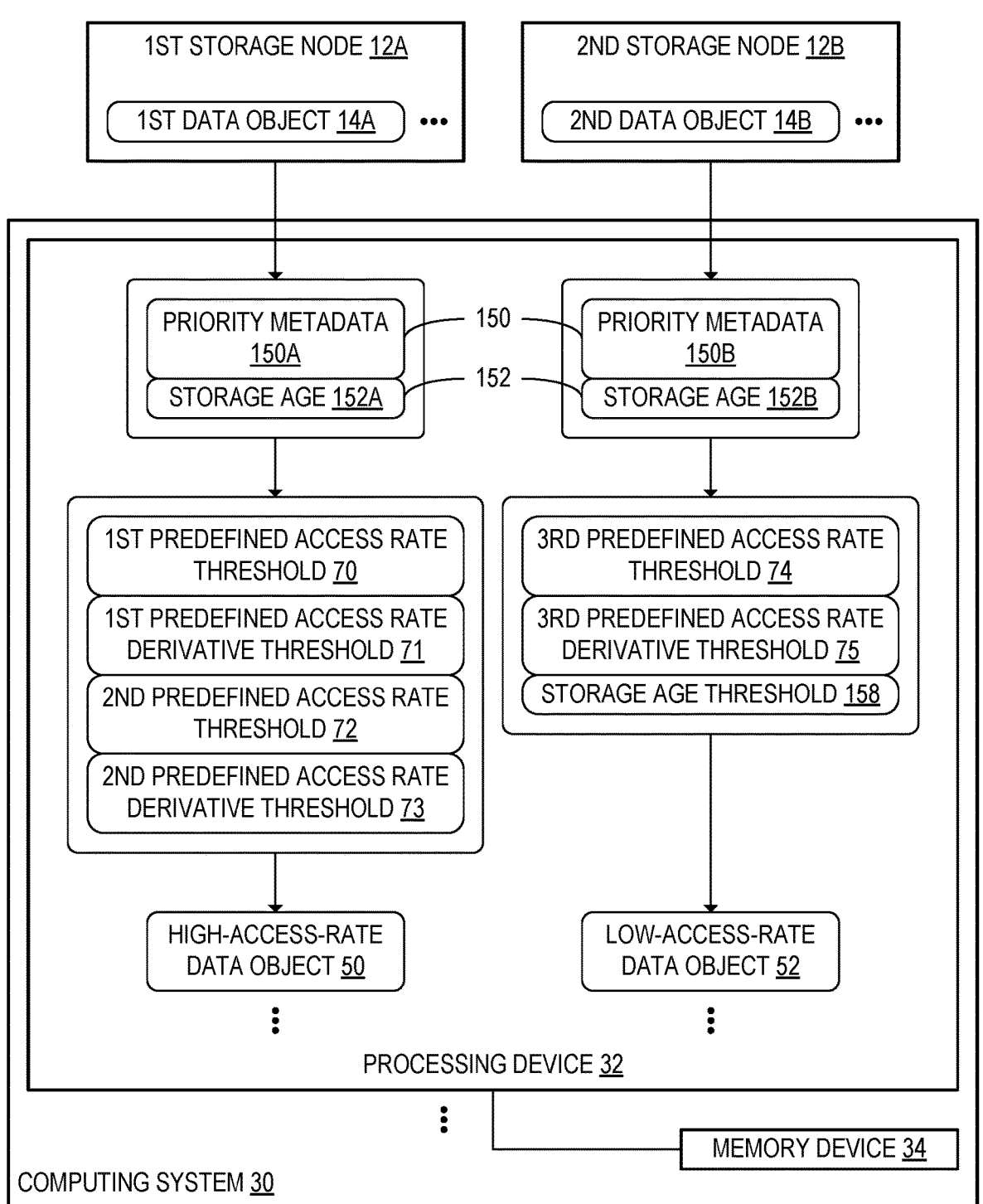
FIG. 7 schematically shows the computing system when additional inputs are used to identify the high-access-rate data object, according to the example of FIG. 2.

FIG. 7 schematically shows the computing system 30 when additional inputs not shown in FIG. 2 are used to identify the high-access-rate data object 50 and the low-access-rate data object 52. In the example of FIG. 7, the one or more processing devices 32 are further configured to receive priority metadata 150 associated with the data objects 14 stored at the storage nodes 12. FIG. 7 shows priority metadata 150A associated with the first data object 14A and priority metadata 150B associated with the second data object 14B. The priority metadata 150 of a data object 14 may, for example, indicate an expected access rate of the data object 14. A target latency level may also be indicated in the priority metadata 150. For example, log data may have priority metadata 150 indicating a short target write latency. The priority metadata 150 of the log data may further indicate that the log data has a low expected access rate, since the log data is not typically read after its initial writing, except when recovering from a crash at a computing device associated with the log data.

The one or more processing devices 32 may be configured to identify the first data object 14A as a high-access-rate data object 50 based at least in part on the priority metadata 150A of the first data object 14A. In the example of FIG. 7, the priority metadata 150A is used to select or modify the predefined access rate thresholds 70 and 72 and predefined access rate derivative thresholds 71 and 73 for the first data object 14A. The one or more processing devices 32 may be further configured to use the priority metadata 150B to modify the third predefined access rate threshold 74 and the third predefined access rate derivative threshold 75 that are used to identify the second data object 14B as a low-access-rate data object 52.

The one or more processing devices 32 may be further configured to receive respective storage ages 152 of the storage nodes 12. In the example of FIG. 7, the one or more processing devices 32 are configured to receive a storage age 152A of the first storage node 12A and a storage age 152B of the second storage node 12B. The storage ages 152 of the storage nodes 12 may indicate estimated remaining hardware lifetimes of storage devices included in the storage nodes 12. For example, the storage age 152 of a solid-state drive (SSD) may be a program erase count (PEC) of the SSD. The storage age 152 of a storage node 12 may, in some examples, be computed as an average PEC of the SSDs included in the storage node 12.

The one or more processing devices 32 may be configured to identify the first data object 14A as a high-access-rate data object 50 based at least in part on the storage age 152A of the first storage node 12A. For example, as shown in FIG. 7, the predefined access rate thresholds 70 and 72 and predefined access rate derivative thresholds 71 and 73 may be lowered as the storage age 152A increases. Thus, in order to avoid a hardware failure during a period of high traffic at the first storage node 12A, the thresholds at which the first data object 14A is transferred to the second storage node 12B may be lowered as the memory devices of the first storage node 12A age.

The one or more processing devices 32 may be further configured to identify the second data object 14B as a low-access-rate data object 52 using the storage age 152B of the second data object 14B. For example, in order to avoid transferring the high-access-rate data object 50 to an SSD memory device that has a high storage age 152B, the one or more processing devices 32 may have a storage age threshold 158 for the storage age 152B. As an additional criterion for transferring the high-access-rate data object 50 to the second storage node 12B, the one or more processing devices 32 may be configured to determine that the storage age 152B is below the storage age threshold 158.

FIG. 8A shows a flowchart of method 200 for use with a computing system. The computing system at which the method 200 is performed is configured to execute a scheduler and a controller for a storage network of a distributed storage system. The storage network includes a plurality of storage nodes at which data objects are stored.

At step 202, the method 200 includes detecting a congestion condition occurring at a first storage node located in the storage network of the distributed storage system. The congestion condition is a condition in which latency at the first storage node is elevated due to high traffic. At step 204, in response to detecting the congestion condition, the method 200 further includes obtaining respective first access rate data for a first plurality of data objects stored at the first storage node. The first access rate data is time-series data that, for each of the first plurality of data objects, indicates how frequently those data objects are read from storage.

At step 206, the method 200 further includes flagging a first data object among the first plurality of data objects as a high-access-rate data object based at least in part on the first access rate data. In some examples, performing step 206 includes performing step 208. At step 208, the method 200 may further include determining that an access rate of the first data object is above a first predefined access rate threshold, or that a derivative of the access rate of the first data object is above a first predefined access rate derivative threshold. The first data object may be flagged as the high-access-rate data object in response to making either of the above determinations.

In some examples, other properties of the first data object may also be considered when determining whether to flag the first data object as a high-access-rate data object. For example, the first data object may be identified as a high-access-rate data object based at least in part on priority metadata of the first data object. Additionally or alternatively, a storage age of the first storage node may be used when determining whether to identify the first data object as a high-access-rate data object.

At step 210, in response to flagging the high-access-rate data object, the method 200 may further include computing a transfer path between the first storage node and a second storage node in the storage network. At step 212, the method 200 further includes transferring the high-access-rate data object from the first storage node to the second storage node along the transfer path. Accordingly, when congestion occurs at the first storage node, the high-access-rate data object is offloaded from the first storage node to the second storage node in order to reduce the congestion. In some examples, multi-path transfer of the high-access-rate data object is performed.

FIG. 8B shows additional steps of the method 200 that are performed in some examples. Step 214 of the method 200 may be performed when the first data object is flagged at step 206. At step 214, the method 200 may further include determining that the access rate of the first data object is above a second predefined access rate threshold that is higher than the first predefined access rate threshold. Additionally or alternatively, step 214 may include determining that the derivative of the access rate of the first data object is above a second predefined access rate threshold that is higher than the first predefined access rate threshold.

Steps 216 and 218 may be performed when transferring the high-access-rate data object at step 212. At step 216, the method 200 may further include copying the high-access-rate data object. At step 218, the method 200 may further include transferring the copy of the high-access-rate data object to the second storage node, such that two or more copies of the high-access-rate data object are concurrently stored and accessible within the storage network. Thus, the storage network may be configured to store additional copies of data objects that have very high access rates or increases in their access rates.

FIG. 8C shows additional steps of the method 200 that may be performed in order to detect the congestion condition at step 202. At step 220, the method 200 may further include obtaining storage node performance data respectively associated with a plurality of storage nodes included in the storage network. The plurality of storage nodes include the first storage node and the second storage node. The storage node performance data may, for example, include respective write latencies, read latencies, and write ratios of the storage nodes.

At step 222, the method 200 may further include computing a plurality of storage node weights associated with the storage nodes based at least in part on the storage node performance data. For example, the storage node weights may be average latencies computed from the write latencies, read latencies, and write ratios of the storage nodes. At step 224, the method 200 may further include detecting the congestion condition occurring at the first storage node at least in part by comparing the storage node weights to a storage node weight threshold. When the storage node weight of a storage node exceeds the storage node weight threshold, the scheduler may indicate that the congestion condition has occurred at that storage node.

FIG. 8D shows additional steps of the method 200 that may be performed in examples in which the steps of FIG. 8C are performed. At step 226, the method 200 may further include obtaining path congestion data associated with a plurality of network paths within the storage network. In some examples, the path congestion data may include a plurality of round trip times (RTTs) of probe packets transmitted along the plurality of network paths.

At step 228, based at least in part on the path congestion data, the method 200 may further include computing a plurality of network path weights associated with a respective plurality of network paths between the storage nodes. These network weights may be computed based at least in part on the RTTs of the probe packets. Network path bandwidth data may also be used in some examples when computing the network path weights. At step 230, based at least in part on the storage node weights and the network path weights, the method 200 may further include selecting the transfer path along which the high-access-rate data object is transferred. For example, a transfer path with a lowest total weight may be selected. In some examples, multiple transfer paths are selected, and multi-path transfer is performed.

FIG. 8E shows additional steps of the method 200 that are performed in some examples. At step 232, the method 200 may further include obtaining second access rate data for a second plurality of data objects stored at the second storage node. Based at least in part on the second access rate data, the method 200 may further include, at step 234, flagging a second data object among the second plurality of data objects as a low-access-rate data object. At step 236, the method 200 may further include, in response to transferring the high-access-rate data object from the first storage node to the second storage node, transferring the low-access-rate data object to the first storage node along the transfer path. Accordingly, the low-access-rate data object may replace the high-access-rate data object at the first storage node, thereby filling storage capacity that may otherwise be unoccupied.

FIG. 8F shows additional steps of the method 200 that are performed in some examples. At step 238, prior to transmitting the high-access-rate data object to the second storage node, the method 200 may further include computing a performance simulation of the second storage node. In the performance simulation, the second storage node is simulated as storing the high-access-rate data object. The performance simulation may, in some examples, include a storage network simulation machine learning model that receives simulated storage location data, simulated workload data, and a simulated network topology as inputs. In such examples, the storage network simulation machine learning model may be configured to output predicted performance data for the storage nodes.

At step 240, the method 200 may further include determining that the congestion condition does not occur at the second storage node in the performance simulation. The weight-based approach discussed above may be used to determine whether the congestion condition occurs at the simulated second storage node. At step 242, the method 200 may further include transferring the high-access-rate data object to the second storage node in response to determining that the congestion condition does not occur at the second storage node in the performance simulation. Thus, the scheduler may predict the performance of the second storage node to determine whether transferring the high-access-rate data object to the second storage node will reduce congestion.

FIG. 8G shows additional steps of the method 200 that are performed in some examples. At step 244, the method 200 may further include detecting the congestion condition occurring at the second storage node subsequently to transferring the high-access-rate data object to the second storage node. At step 246, the method 200 may further include returning the high-access-rate data object to the first storage node in response to detecting the congestion condition occurring at the second storage node. The high-access-rate data object may accordingly be returned when transferring the high-access-rate data object to the second storage node still incurs storage-node-level congestion. In some examples, when the high-access-rate data object is returned to the first storage node, copies of the high-access-rate data object are concurrently stored at the first and second storage nodes.

Using the techniques discussed above, data objects may be relocated between storage nodes in a storage network in order to alleviate storage-node-level congestion. This relocation is performed in a manner in which properties of the storage nodes and network paths are jointly considered at the scheduler when computing transfer instructions. Thus, the data object relocation may be performed in a manner that avoids congestion at both the storage node level and at the network level. Using the devices and methods discussed above, quality of service at the storage network may be made robust to rapid changes in demand for specific data objects. Accordingly, client devices may access high-traffic data objects reliably and with low latency.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
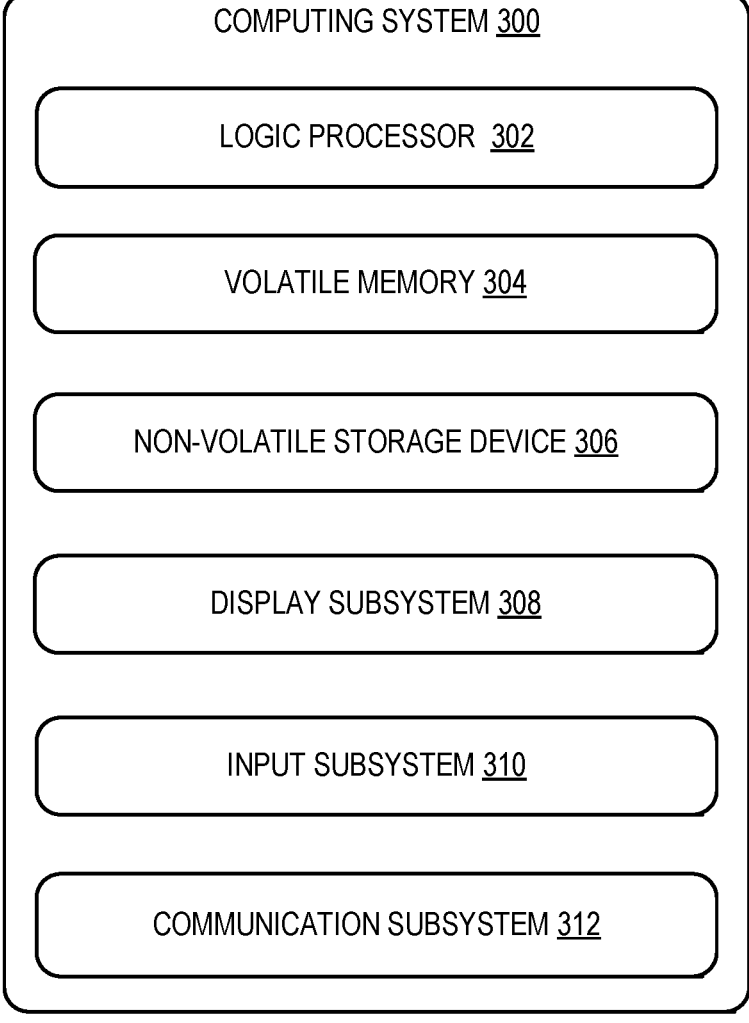
FIG. 9 shows a schematic view of an example computing environment in which the computing system of FIG. 1A may be instantiated.

FIG. 9 schematically shows a non-limiting embodiment of a computing system 300 that can enact one or more of the methods and processes described above. Computing system 300 is shown in simplified form. Computing system 300 may embody the computing system 30 described above and illustrated in FIG. 1A. Computing system 300 may take the form of one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

The following paragraphs provide additional description of the subject matter of the present disclosure. According to one aspect of the present disclosure, a computing system is provided, including one or more processing devices configured to detect a congestion condition occurring at a first storage node located in a storage network of a distributed storage system. In response to detecting the congestion condition, the one or more processing devices are further configured to obtain respective first access rate data for a first plurality of data objects stored at the first storage node. Based at least in part on the first access rate data, the one or more processing devices are further configured to flag a first data object among the first plurality of data objects as a high-access-rate data object. In response to flagging the high-access-rate data object, the one or more processing devices are further configured to compute a transfer path between the first storage node and a second storage node in the storage network. The one or more processing devices are further configured to transfer the high-access-rate data object from the first storage node to the second storage node along the transfer path. The above features may have the technical effect of transferring a high-traffic data object away from a storage node when that storage node experiences congestion.

According to this aspect, the one or more processing devices may be configured to flag the first data object as the high-access-rate data object in response to determining that an access rate of the first data object is above a first predefined access rate threshold, or that a derivative of the access rate of the first data object is above a first predefined access rate derivative threshold. The above features may have the technical effect of identifying the high-access-rate data object as a data object that has high traffic or rapidly increasing traffic.

According to this aspect, to transfer the high-access-rate data object from the first storage node to the second storage node, the one or more processing devices may be further configured to copy the high-access-rate data object and transfer the copy of the high-access-rate data object to the second storage node, such that two or more copies of the high-access-rate data object are concurrently stored and accessible within the storage network. The above features may have the technical effect of reducing congestion at the storage node by making an additional copy of the high-access-rate data object accessible at a different storage node.

According to this aspect, the one or more processing devices may be configured to copy the high-access-rate data object and transfer the copy in response to determining that the access rate of the first data object is above a second predefined access rate threshold that is higher than the first predefined access rate threshold, or that the derivative of the access rate of the first data object is above a second predefined access rate derivative threshold that is higher than the first predefined access rate derivative threshold. The above features may have the technical effect of copying the high-access-rate data object under conditions of very high traffic or a very high increase in traffic.

According to this aspect, the one or more processing devices may be further configured to, prior to transferring the high-access-rate data object, compute a performance simulation of the second storage node. In the performance simulation, the second storage node may store the high-access-rate data object. The one or more processing devices may be further configured to determine that the congestion condition does not occur at the second storage node in the performance simulation. The one or more processing devices may be further configured to transfer the high-access-rate data object to the second storage node in response to determining that the congestion condition does not occur at the second storage node in the performance simulation. The above features may have the technical effect of testing whether transferring the high-access-rate data object would alleviate storage node congestion prior to transferring the high-access-rate data object.

According to this aspect, the one or more processing devices may be further configured to obtain storage node performance data respectively associated with a plurality of storage nodes included in the storage network. The plurality of storage nodes may include the first storage node and the second storage node. Based at least in part on the storage node performance data, the one or more processing devices may be further configured to compute a plurality of storage node weights associated with the storage nodes. The one or more processing devices may be further configured to detect the congestion condition occurring at the first storage node at least in part by comparing the storage node weights to a storage node weight threshold. The above features may have the technical effect of identifying when congestion occurs at the first storage node.

According to this aspect, the one or more processing devices may be further configured to obtain path congestion data associated with a plurality of network paths within the storage network. The path congestion data may include a plurality of round trip times (RTTs) of probe packets transmitted along the plurality of network paths. The above features may have the technical effect of identifying congestion in the network paths.

According to this aspect, the one or more processing devices may be configured to compute the transfer path at least in part by, based at least in part on the path congestion data, computing a plurality of network path weights associated with a respective plurality of network paths between the storage nodes. Computing the transfer path may further include, based at least in part on the storage node weights and the network path weights, selecting the transfer path along which the high-access-rate data object is transferred. The above features may have the technical effect of selecting a transfer path that avoids congestion at both the storage nodes and the network path.

According to this aspect, the one or more processing devices may be further configured to obtain second access rate data for a second plurality of data objects stored at the second storage node. Based at least in part on the second access rate data, the one or more processing devices may be further configured to flag a second data object among the second plurality of data objects as a low-access-rate data object. In response to transferring the high-access-rate data object from the first storage node to the second storage node, the one or more processing devices may be further configured to transfer the low-access-rate data object to the first storage node along the transfer path. The above features may have the technical effect of allocating storage space more efficiently between the first and second storage nodes.

According to this aspect, the one or more processing devices may be configured to identify the first data object as a high-access-rate data object based at least in part on priority metadata of the first data object. The above features may have the technical effect of using a priority level indicated in the priority metadata to set a threshold at which a data object is determined to be high-access-rate.

According to this aspect, the one or more processing devices may be configured to identify the first data object as a high-access-rate data object based at least in part on a storage age of the first storage node. The above features may have the technical effect of avoiding storage device failure at the first storage node under conditions of high traffic.

According to this aspect, subsequently to transferring the high-access-rate data object, the one or more processing devices may be further configured to detect the congestion condition occurring at the second storage node. In response to detecting the congestion condition occurring at the second storage node, the one or more processing devices may be further configured to return the high-access-rate data object to the first storage node. The above features may have the technical effect of rolling back the data object transfer when storage-node-level congestion still occurs subsequently to transferring the high-access-rate data object.

According to another aspect of the present disclosure, a method for use with a computing system is provided. The method may include detecting a congestion condition occurring at a first storage node located in a storage network of a distributed storage system. In response to detecting the congestion condition, the method may further include obtaining respective first access rate data for a first plurality of data objects stored at the first storage node. Based at least in part on the first access rate data, the method may further include flagging a first data object among the first plurality of data objects as a high-access-rate data object. In response to flagging the high-access-rate data object, the method may further include computing a transfer path between the first storage node and a second storage node in the storage network. The method may further include transferring the high-access-rate data object from the first storage node to the second storage node along the transfer path. The above features may have the technical effect of transferring a high-traffic data object away from a storage node when that storage node experiences congestion.

According to this aspect, the first data object may be flagged as the high-access-rate data object in response to determining that an access rate of the first data object is above a first predefined access rate threshold, or that a derivative of the access rate of the first data object is above a first predefined access rate derivative threshold. The above features may have the technical effect of identifying the high-access-rate data object as a data object that has high traffic or rapidly increasing traffic.

According to this aspect, transferring the high-access-rate data object from the first storage node to the second storage node may include copying the high-access-rate data object. Transferring the high-access-rate data object may further include transferring the copy of the high-access-rate data object to the second storage node, such that two or more copies of the high-access-rate data object are concurrently stored and accessible within the storage network. The above features may have the technical effect of reducing congestion at the storage node by making an additional copy of the high-access-rate data object accessible at a different storage node.

According to this aspect, the method may further include obtaining storage node performance data respectively associated with a plurality of storage nodes included in the storage network. The plurality of storage nodes may include the first storage node and the second storage node. Based at least in part on the storage node performance data, the method may further include computing a plurality of storage node weights associated with the storage nodes. The method may further include detecting the congestion condition occurring at the first storage node at least in part by comparing the storage node weights to a storage node weight threshold. The above features may have the technical effect of identifying when congestion occurs at the first storage node.

According to this aspect, computing the transfer path may include obtaining path congestion data associated with a plurality of network paths within the storage network. Based at least in part on the path congestion data, computing the transfer path may further include computing a plurality of network path weights associated with a respective plurality of network paths between the storage nodes. Based at least in part on the storage node weights and the network path weights, computing the transfer path may further include selecting the transfer path along which the high-access-rate data object is transferred. The above features may have the technical effect of selecting a transfer path that avoids congestion at both the storage nodes and the network path.

According to this aspect, the method may further include obtaining second access rate data for a second plurality of data objects stored at the second storage node. Based at least in part on the second access rate data, the method may further include flagging a second data object among the second plurality of data objects as a low-access-rate data object. In response to transferring the high-access-rate data object from the first storage node to the second storage node, the method may further include transferring the low-access-rate data object to the first storage node along the transfer path. The above features may have the technical effect of allocating storage space more efficiently between the first and second storage nodes.

According to this aspect, the first data object is identified as a high-access-rate data object based at least in part on priority metadata of the first data object and/or a storage age of the first storage node. The above features may have the technical effect of using a priority level indicated in the priority metadata to set a threshold at which a data object is determined to be high-access-rate. The above features may additionally or alternatively have the technical effect of avoiding storage device failure at the first storage node under conditions of high traffic.

According to another aspect of the present disclosure, a computing system is provided, including one or more processing devices configured to detect a congestion condition occurring at a first storage node located in a storage network of a distributed storage system. In response to detecting the congestion condition, the one or more processing devices are further configured to obtain respective access rate data for a first plurality of data objects stored at the first storage node and a second plurality of data objects stored at a second storage node in the storage network. Based at least in part on the access rate data, the one or more processing devices are further configured to flag a first data object among the first plurality of data objects as a high-access-rate data object and flag a second data object among the second plurality of data objects as a low-access-rate data object. In response to flagging the high-access-rate data object and the low-access rate data object, the one or more processing devices are further configured to transfer the high-access-rate data object from the first storage node to the second storage node. The one or more processing devices are further configured to transfer the low-access-rate data object from the second storage node to the first storage node.

"And/or" as used herein is defined as the inclusive or V, as specified by the following truth table:

| A | B | A V B |
|---|---|---|
| True | True | True |
| True | False | True |

-continued

| A | B | A V B |
|---|---|---|
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more processing devices configured to:
obtain storage node performance data respectively associated with a plurality of storage nodes included in a storage network of a distributed storage system;
based at least in part on the storage node performance data, compute a plurality of storage node weights associated with the storage nodes;
at least in part by comparing the storage node weights to a storage node weight threshold, detect a congestion condition occurring at a first storage node located in the storage network;
in response to detecting the congestion condition, obtain respective first access rate data for a first plurality of data objects stored at the first storage node;
based at least in part on the first access rate data, flag a first data object among the first plurality of data objects as a high-access-rate data object;
in response to flagging the high-access-rate data object, compute a transfer path between the first storage node and a second storage node in the storage network; and
transfer the high-access-rate data object from the first storage node to the second storage node along the transfer path.

2. The computing system of claim 1, wherein the one or more processing devices are configured to flag the first data object as the high-access-rate data object in response to determining that:
an access rate of the first data object is above a first predefined access rate threshold; or
a derivative of the access rate of the first data object is above a first predefined access rate derivative threshold.

3. The computing system of claim 2, wherein, to transfer the high-access-rate data object from the first storage node to the second storage node, the one or more processing devices are further configured to:
copy the high-access-rate data object; and
transfer the copy of the high-access-rate data object to the second storage node, such that two or more copies of the high-access-rate data object are concurrently stored and accessible within the storage network.

4. The computing system of claim 3, wherein the one or more processing devices are configured to copy the high-access-rate data object and transfer the copy in response to determining that:

the access rate of the first data object is above a second predefined access rate threshold that is higher than the first predefined access rate threshold; or the derivative of the access rate of the first data object is above a second predefined access rate derivative threshold that is higher than the first predefined access rate derivative threshold.

5. The computing system of claim 1, wherein the one or more processing devices are further configured to:

prior to transferring the high-access-rate data object, compute a performance simulation of the second storage node, wherein, in the performance simulation, the second storage node stores the high-access-rate data object;

determine that the congestion condition does not occur at the second storage node in the performance simulation; and transfer the high-access-rate data object to the second storage node in response to determining that the congestion condition does not occur at the second storage node in the performance simulation.

6. The computing system of claim 1, wherein:

the one or more processing devices are further configured to obtain path congestion data associated with a plurality of network paths within the storage network; and the path congestion data includes a plurality of round trip times (RTTs) of probe packets transmitted along the plurality of network paths.

7. The computing system of claim 1, wherein the one or more processing devices are configured to compute the transfer path at least in part by:

based at least in part on the path congestion data, computing a plurality of network path weights associated with a respective plurality of network paths between the storage nodes; and based at least in part on the storage node weights and the network path weights, selecting the transfer path along which the high-access-rate data object is transferred.

8. The computing system of claim 1, wherein the one or more processing devices are further configured to:

obtain second access rate data for a second plurality of data objects stored at the second storage node;

based at least in part on the second access rate data, flag a second data object among the second plurality of data objects as a low-access-rate data object; and in response to transferring the high-access-rate data object from the first storage node to the second storage node, transfer the low-access-rate data object to the first storage node along the transfer path.

9. The computing system of claim 1, wherein the one or more processing devices are configured to identify the first data object as a high-access-rate data object based at least in part on priority metadata of the first data object.

10. The computing system of claim 1, wherein the one or more processing devices are configured to identify the first data object as a high-access-rate data object based at least in part on a storage age of the first storage node.

11. The computing system of claim 1, wherein, subsequently to transferring the high-access-rate data object, the one or more processing devices are further configured to:

detect the congestion condition occurring at the second storage node; and in response to detecting the congestion condition occurring at the second storage node, return the high-access-rate data object to the first storage node.

12. A method for use with a computing system, the method comprising:

obtaining storage node performance data respectively associated with a plurality of storage nodes included in a storage network of a distributed storage system;

based at least in part on the storage node performance data, computing a plurality of storage node weights associated with the storage nodes;

at least in part by comparing the storage node weights to a storage node weight threshold, detecting a congestion condition occurring at a first storage node located in the storage network;

in response to detecting the congestion condition, obtaining respective first access rate data for a first plurality of data objects stored at the first storage node;

based at least in part on the first access rate data, flagging a first data object among the first plurality of data objects as a high-access-rate data object;

in response to flagging the high-access-rate data object, computing a transfer path between the first storage node and a second storage node in the storage network; and transferring the high-access-rate data object from the first storage node to the second storage node along the transfer path.

13. The method of claim 12, wherein the first data object is flagged as the high-access-rate data object in response to determining that:

an access rate of the first data object is above a first predefined access rate threshold; or a derivative of the access rate of the first data object is above a first predefined access rate derivative threshold.

14. The method of claim 12, wherein transferring the high-access-rate data object from the first storage node to the second storage node includes:

copying the high-access-rate data object; and transferring the copy of the high-access-rate data object to the second storage node, such that two or more copies of the high-access-rate data object are concurrently stored and accessible within the storage network.

15. The method of claim 12, wherein computing the transfer path includes:

obtaining path congestion data associated with a plurality of network paths within the storage network;

based at least in part on the path congestion data, computing a plurality of network path weights associated with a respective plurality of network paths between the storage nodes; and based at least in part on the storage node weights and the network path weights, selecting the transfer path along which the high-access-rate data object is transferred.

16. The method of claim 12, further comprising:

obtaining second access rate data for a second plurality of data objects stored at the second storage node;

based at least in part on the second access rate data, flagging a second data object among the second plurality of data objects as a low-access-rate data object; and in response to transferring the high-access-rate data object from the first storage node to the second storage node, transferring the low-access-rate data object to the first storage node along the transfer path.

17. The method of claim 12, wherein the first data object is identified as a high-access-rate data object based at least in part on:

priority metadata of the first data object; and/or a storage age of the first storage node.

18. A computing system comprising:

one or more processing devices configured to:

obtain storage node performance data respectively associated with a plurality of storage nodes included in a storage network system;

based at least in part on the storage node performance data, compute a plurality of storage node weights associated with the storage nodes;

at least in part by comparing the storage node weights to a storage node weight threshold, detect a congestion condition occurring at a first storage node located in the storage network;

in response to detecting the congestion condition, obtain respective access rate data for:

a first plurality of data objects stored at the first storage node; and a second plurality of data objects stored at a second storage node in the storage network;

based at least in part on the access rate data:

flag a first data object among the first plurality of data objects as a high-access-rate data object; and flag a second data object among the second plurality of data objects as a low-access-rate data object; and in response to flagging the high-access-rate data object and the low-access rate data object:

compute a transfer path between the first storage node and the second storage node in the storage network;

transfer the high-access-rate data object from the first storage node to the second storage node along the transfer path; and transfer the low-access-rate data object from the second storage node to the first storage node along the transfer path.

* * * * *